United States Patent
Queiroz et al.

(10) Patent No.: US 12,287,639 B1
(45) Date of Patent: Apr. 29, 2025

(54) FLOOR PLAN REPAIR SYSTEM FOR AUTONOMOUS MOBILE DEVICES

(71) Applicant: Amazon Technologies, Inc., Seattle, WA (US)

(72) Inventors: Tiago Etiene Queiroz, Mateo, CA (US); Nikhil Sharma, Fremont, CA (US); Prashant Anand Srivastava, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 584 days.

(21) Appl. No.: 17/545,587

(22) Filed: Dec. 8, 2021

Related U.S. Application Data

(60) Provisional application No. 63/261,271, filed on Sep. 16, 2021, provisional application No. 63/261,282, filed on Sep. 16, 2021, provisional application No. 63/261,278, filed on Sep. 16, 2021, provisional application No. 63/261,288, filed on Sep. 16, 2021.

(51) Int. Cl.
  *G05D 1/639* (2024.01)
  *G05D 1/00* (2006.01)
  *G06T 17/20* (2006.01)

(52) U.S. Cl.
  CPC ......... *G05D 1/0274* (2013.01); *G05D 1/0221* (2013.01); *G05D 1/0238* (2013.01); *G05D 1/639* (2024.01); *G06T 17/20* (2013.01)

(58) Field of Classification Search
  CPC ....... G06T 17/20; G05D 1/6482; G05D 1/639
  See application file for complete search history.

(56) References Cited

U.S. PATENT DOCUMENTS

| | | | |
|---|---|---|---|
| 11,282,270 B2 * | 3/2022 | Li | G06T 7/11 |
| 11,348,269 B1 * | 5/2022 | Ebrahimi Afrouzi | G01S 17/86 |
| 2010/0125968 A1 | 5/2010 | Ho | |
| 2016/0055661 A1 * | 2/2016 | Li | H04W 4/33 |
| | | | 345/593 |
| 2017/0185085 A1 | 6/2017 | Storfer et al. | |
| 2017/0361468 A1 | 12/2017 | Cheuvront | |
| 2019/0025838 A1 * | 1/2019 | Artes | G05D 1/0246 |
| 2019/0120633 A1 | 4/2019 | Afrouzi et al. | |
| 2019/0250625 A1 | 8/2019 | Kleiner et al. | |
| 2020/0034351 A1 | 1/2020 | Matsugatani et al. | |

(Continued)

FOREIGN PATENT DOCUMENTS

CN   113642065 A  * 11/2021  ............. G06F 30/13

OTHER PUBLICATIONS

CN 113642065 A machine translation (Year: 2021).*

(Continued)

*Primary Examiner* — Dino Kujundzic
(74) *Attorney, Agent, or Firm* — Eversheds Sutherland (US) LLP

(57) ABSTRACT

Systems and techniques for generation, storage, and updating of common floor plans across shared autonomous mobile devices. The systems and techniques include extraction of semantically meaningful data from one or more occupancy maps to provide a floorplan to a user that aligns with the user's understanding of the space using heuristics and machine learning techniques. The techniques also enable repair of damaged or inconsistent floor plan geometries through the use of polygon triangulation and graph cuts.

20 Claims, 17 Drawing Sheets

(56) References Cited

U.S. PATENT DOCUMENTS

| | | |
|---|---|---|
| 2020/0133302 A1 | 4/2020 | Hillen |
| 2021/0073449 A1* | 3/2021 | Segev ................... G06F 30/27 |
| 2021/0190505 A1* | 6/2021 | Karlsson ................ H04W 4/33 |
| 2022/0329988 A1 | 10/2022 | Zhu et al. |

OTHER PUBLICATIONS

Office Action for U.S. Appl. No. 17/545,778, mailed on Nov. 21, 2023, Prashant Anand Srivastava, "Floor Plan Region Segmentation for Autonomous Mobile Devices", 23 pages.

Office Action for U.S. Appl. No. 17/545,793, mailed on Nov. 22, 2023, Alexander Caughron, "Shared Floor Plan System for Autonomous Mobile Devices", 28 pages.

Office Action for U.S. Appl. No. 17/545,778, mailed on Aug. 23, 2023, Prashant Anand Srivastava, "Floor Plan Region Segmentation for Autonomous Mobile Devices", 22 pages.

Office Action for U.S. Appl. No. 17/545,793, mailed on Jul. 10, 2023, Caughron, "Shared Floor Plan System for Autonomous Mobile Devices", 21 pages.

Office Action for U.S. Appl. No. 17/545,793, dated Aug. 28, 2024, 18 pages.

\* cited by examiner

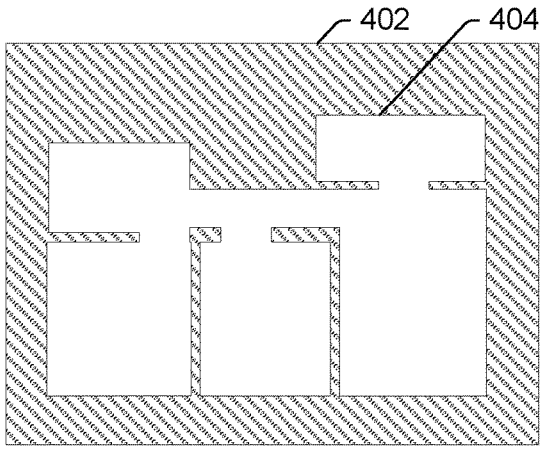
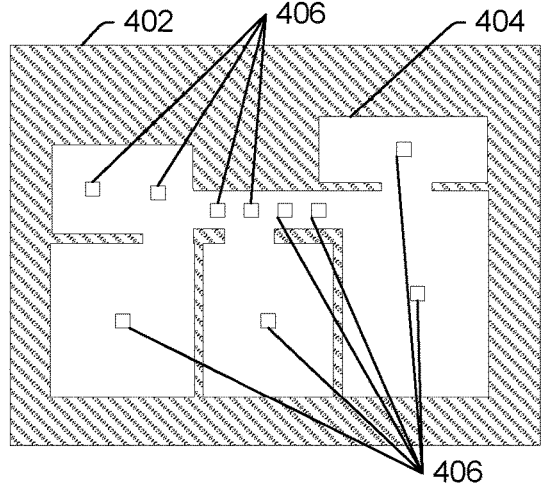
FIG. 4A
FIG. 4B
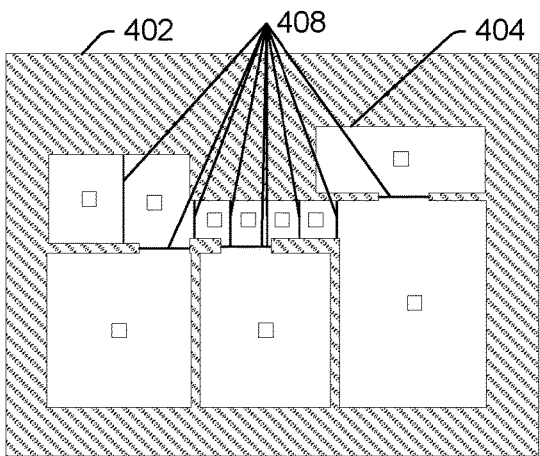
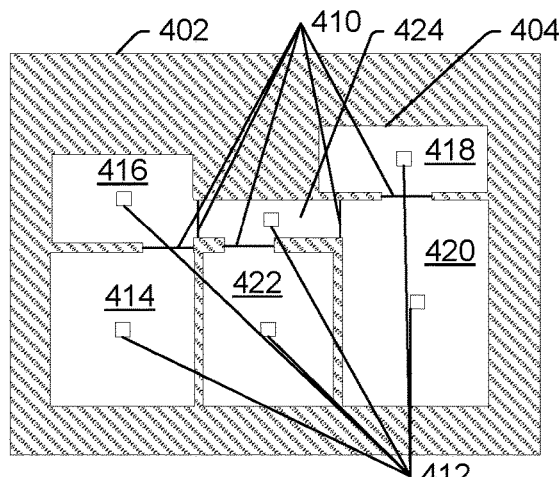
FIG. 4C
FIG. 4D

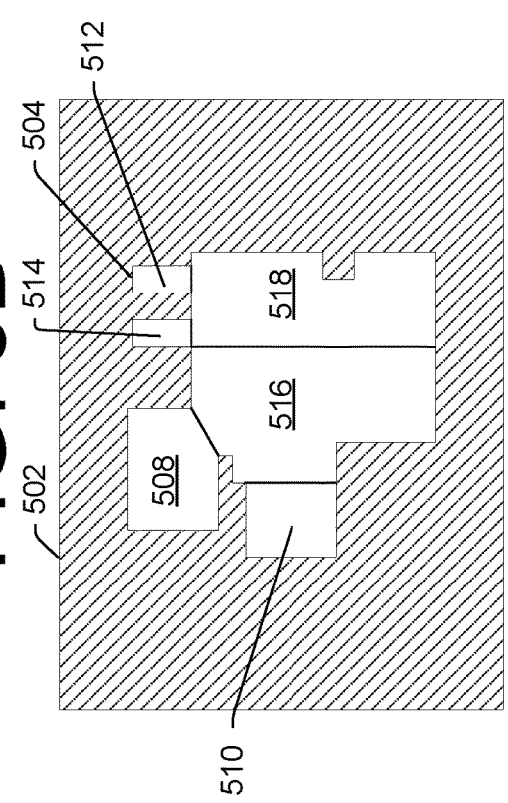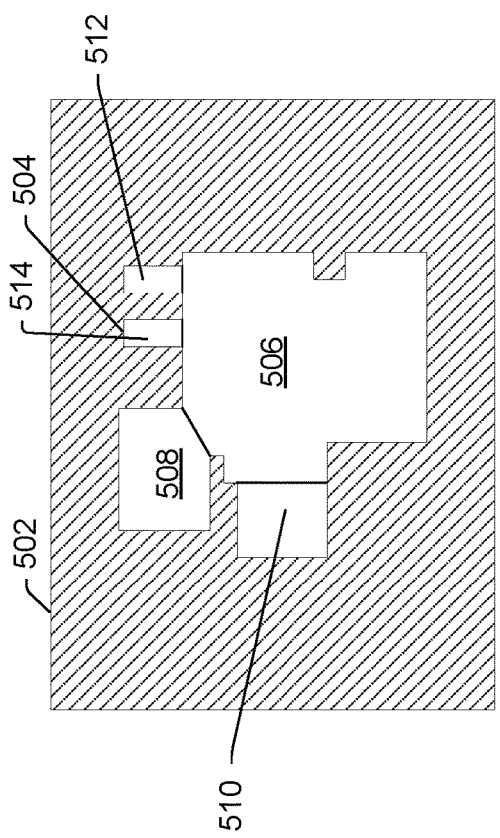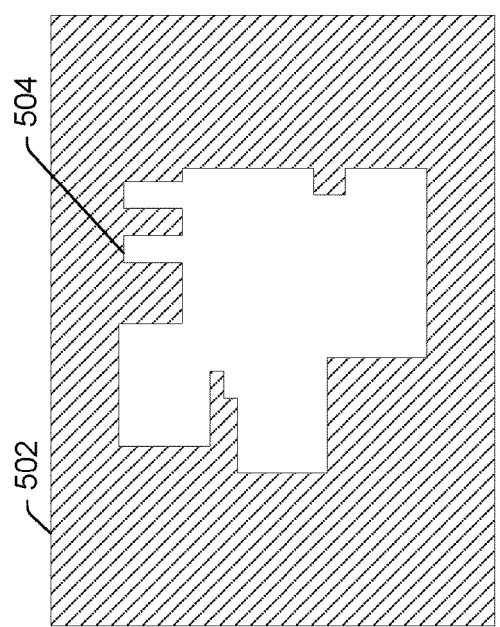

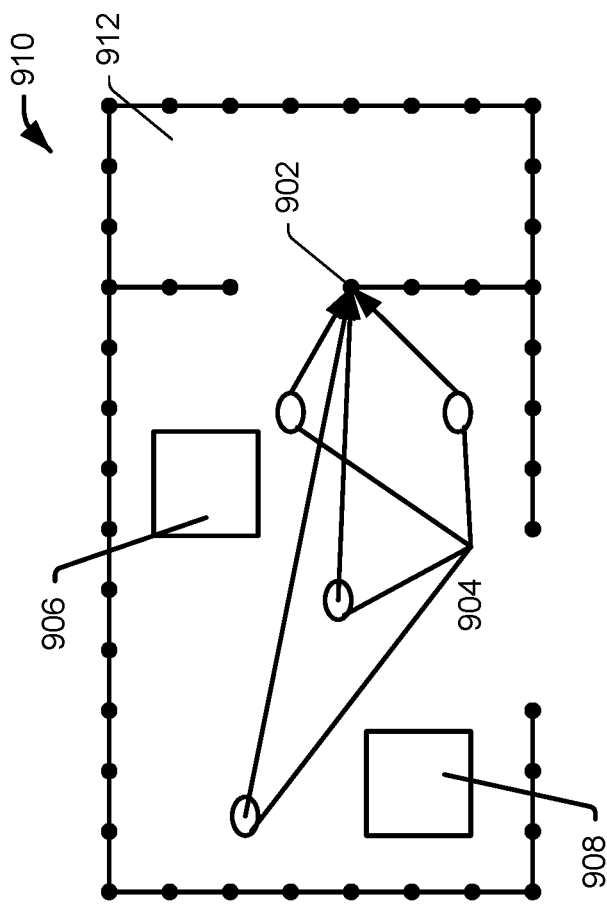
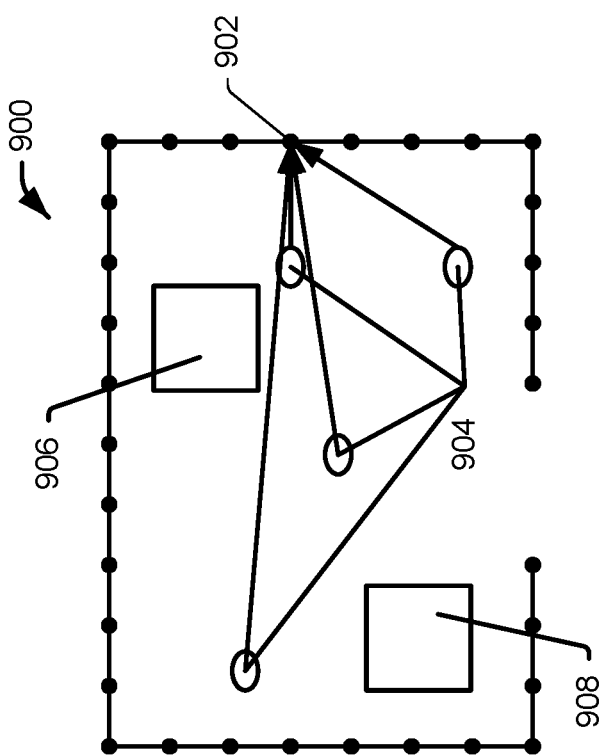
FIG. 9B
FIG. 9A

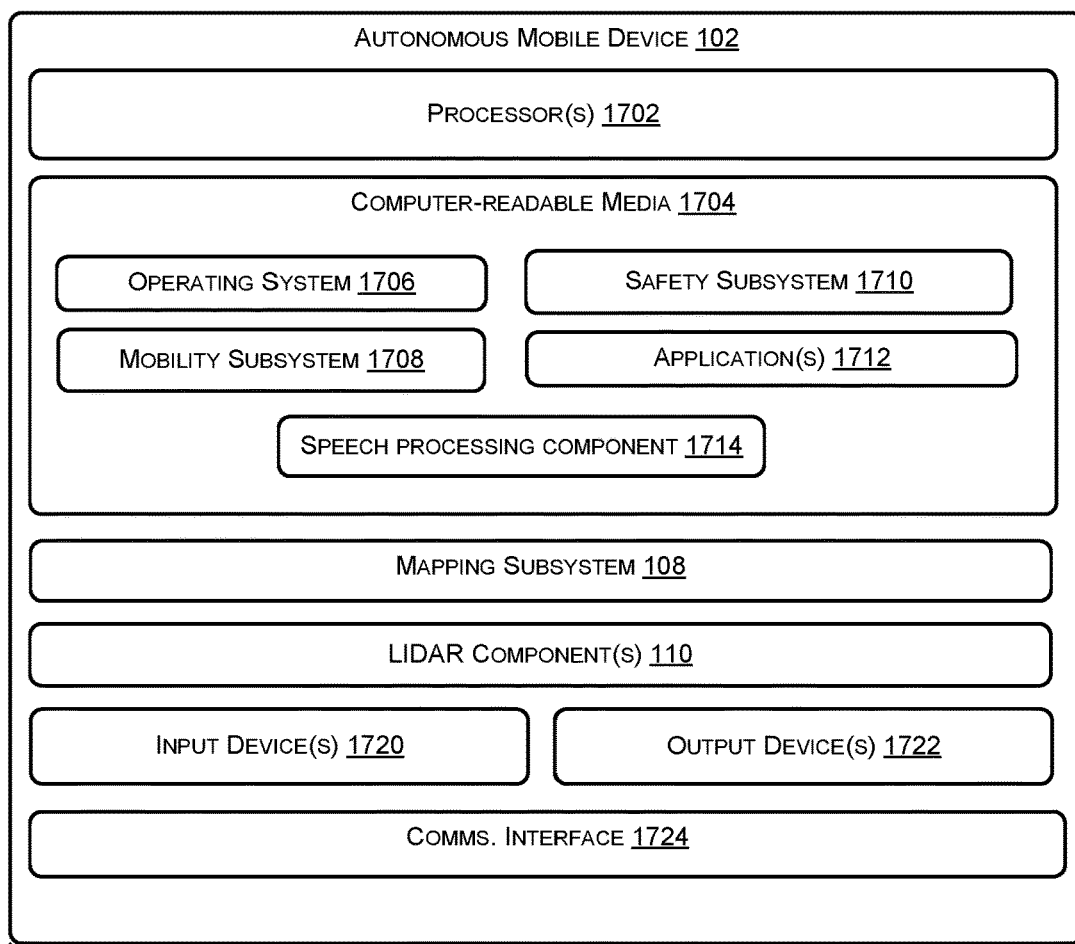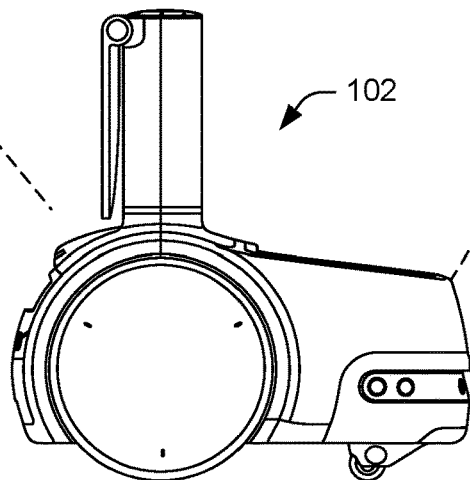
FIG. 17

FLOOR PLAN REPAIR SYSTEM FOR AUTONOMOUS MOBILE DEVICES

CROSS-REFERENCE TO RELATED APPLICATIONS

This application claims the benefit of U.S. Provisional Patent Application No. 63/261,271, filed Sep. 16, 2021, U.S. Provisional Patent Application No. 63/261,278, filed Sep. 16, 2021, U.S. Provisional Patent Application No. 63/261,282, filed Sep. 16, 2021, and U.S. Provisional Patent Application No. 63/261,288, filed Sep. 16, 2021, each of which is incorporated by reference herein in its entirety for all purposes.

BACKGROUND

Household robots are becoming increasingly popular. Some household robots are capable of moving over a floor autonomously. As an autonomous robot moves, sensors of the robot can be used to detect and avoid hazards, such as obstacles (e.g., furniture, people, pets, etc.) or cliffs (e.g., steps, ledges, etc.). It can be challenging to equip consumer-grade robots with enough high-quality sensors so that the robot can move safely about an environment in more complex ways (e.g., by making sharper turns, moving at faster speeds, etc.). Such autonomous robot systems may use sensors to create maps of an environment for navigation and use by a user interacting with the autonomous robot systems.

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

FIGS. 4A-4D show a series of floor plans illustrating a process for segmenting a floor plan into regions for room geometries, according to the present description.

FIGS. 5A-5D show a series of floor plans illustrating a process for automatically segmenting a floor plan into regions for room geometries, according to the present description.

FIGS. 9A-9B illustrate an example of a wall update process for updating a floor plane with additional floor plan data, according to the present description.

FIG. 17 illustrates example components of an autonomous mobile device, such as the autonomous mobile device of FIG. 1.

DETAILED DESCRIPTION

Figure 1:
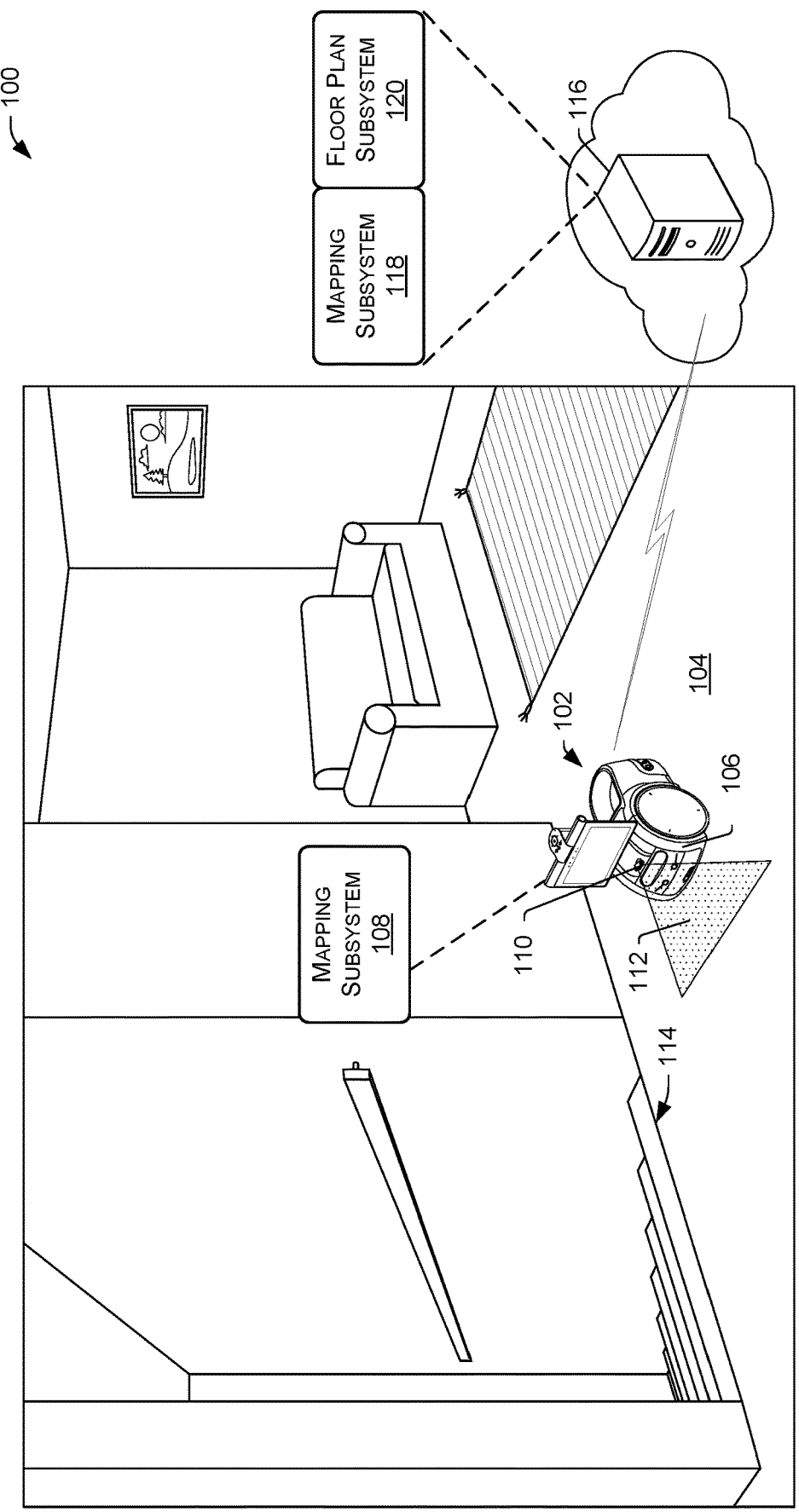
FIG. 1 illustrates an example environment where an example autonomous mobile device is located and may generate a map, according to the present description.

Described herein are, among other things, techniques, devices, and systems, for generating, updating, storing, and repairing floor plan and maps of an environment using data from one or more autonomous mobile devices (AMDs) that may be used by one or more AMDs to navigate and operate within the environment. AMDs include devices capable of navigating within an environment absent user instructions and are also capable of generating an occupancy map. In order to perform location-specific tasks (e.g., in response to user-commands identifying room names), the AMD needs to accurately segment the floor plan into room geometries and maintain the floor plan in an accurate and up to date manner that may be shared among multiple different AMDs operating within the environment.

The floor plan system described herein is configured to generate a single format and maintain a single floorplan layout of an environment that may be accessed and used by one or more AMDs operating within the environment. The one or more AMDs may include devices having different purposes for cleaning, automation of moving items, user interaction, security, monitoring, and the like. The floor plan system may be in communication with the one or more AMDs and may provide a single floor plan that may be used by the different devices. In addition, data from each of the AMDs may be used to update, repair, and augment the floor plan data of the floor plan system. The floor plan may be generated by a floor plan system that receives occupancy map data, lidar data, or other environmental data and generates a floor plan while also enabling updates, repair, automatic tagging, user-provided tagging, and additional metadata to aid in use by the one or more AMDs. The floor plan system provides for automatic segmentation of an occupancy map to determine geometries for different rooms, providing an update to the floor plan based on an update or change to an occupancy map received by an AMD in communication with the floor plan system, and repair of floor plans.

In an illustrative example, an autonomous mobile device (AMD) may reside within an environment (e.g., in a home, office, hotel, facility, etc.). The AMD is configured to move autonomously through a space within the environment using output devices and a mobility subsystem to enable and control the movement of the AMD. For example, the AMD may be a self-powered, household robot with motorized wheels and/or legs configured to propel and/or rotate the AMD in any direction and at various speeds and accelerations. In some examples, the AMD may be a self-powered, industrial robot with motorized movement mechanisms (e.g., wheels, tracks, etc.) configured to propel and/or rotate the AMD and navigate through an industrial environment.

The floor plan system may be embodied in a platform in communication with one or more AMDs in the environment and is a platform used to represent and store the physical spatial environments (e.g. floor plan) and spatial objects in the environment. The floor plan system provides for a schema and model for representing spatial objects (e.g. a room), geometries or shapes of spatial objects (e.g. the shape of room A is square), spatial object metadata (e.g. the name of room A is "kitchen", home monitoring is disabled in room A), typed connections or relationships between spatial objects (room A is connected to room B via door C), edits or changes to spatial objects (e.g. create a new room named "kitchen", change the shape of room A from square X to square Y), and attribution of changes to spatial objects (e.g. the shape of room A was changed by customer Z and device A). The floor plan system includes local and remote (e.g., cloud-based) systems for storing spatial objects, modifying spatial objects, syncing spatial objects between cloud and device floor plan systems (e.g., maintaining a consistent spatial object floor plan across a fleet of AMDs). The floor plan system includes components for communicating with the remote computing system, reading the floor plans, providing updates to floor plans, and providing repairs to the floor plans that may be propagated across the fleet of AMDs and the floor plan cloud system.

In some typical approaches for floor plan extraction, data rich sources are used such as 3D point clouds, externally provided architectural floor plans, images, in addition to occupancy maps. In some examples, AMDs may provide only occupancy maps without additional data-rich sources to provide floor plan extraction. Accordingly, the description herein provides for floor plan extraction using only occupancy maps without requiring additional data-rich sources. The floor plans are semantically meaningful, with the floor plans assigned classes such as free space, unexplored spaces, walls, and clutter. This information may be used by additional components of the floor plan system, as described below. Because many AMDs operate at or near the floor (within three feet or less of the plane of the floor), data gathered will reflect the floor space with a high degree of accuracy. Additionally, because many objects, walls, and environments will include common shapes, sizes, and structures, such as straight walls, ninety degree angles, etc., a set of heuristics may be applied to capture such commonalities and apply to the occupancy maps to extract floor plan features.

Occupancy maps are often noisy and are ambiguous as to walls or clutter. Cleanup of the occupancy map may be applied to regularize occupied pixels from the occupancy map. After initial cleanup of noise heuristics may be applied to further define and extract the floor plan from the occupancy map. The heuristics may include computing a ratio between an area of an object and the convex hull. Such a ratio is expected to be low for walls and high for clutter or objects in an environment. A ratio between a bounding box width and height for an object may similarly provide a differentiation between walls and clutter, with walls having a low ratio while clutter may have a higher ratio. Additional heuristics may be applied to the occupancy map as described herein to extract a floor plan including walls and clutter. The walls may be separated from the clutter to extract a true floor plan of the environment in which clutter may be placed and moved. Once clutter is identified, it may be separated from the walls of the floor plan, for example as a separate layer of the data stored by the floor plan system. If clutter is subsequently moved within the space, it may be identified within the floor plan based on the size and shape of an updated object within the occupancy map. For instance, a coffee table may be moved within the environment, such a move may be reflected in the occupancy map and the floor plan system may identify that the coffee table, which may have associated metadata, is no longer in the original location but a new object is identified in the occupancy data having the same or similar dimensions (e.g., a similar bounding box or similar aspect ratio) that may be identified as the coffee table in a new location with the metadata associated with the new object in the floor plan data.

In some examples, additional processing may be performed, for example in cases where the repaired floor plan 1200 is an occupancy map or floor plan derived from an occupancy map, the occupancy map may not reflect how the user typically envisions their space. In some examples, the floor plan may be extracted from the occupancy map to remain accurate to the occupancy map while also presenting a floor plan that aligns more accurately with user expectations. The processing involves using various heuristics and assumptions about structures of environments.

The process involves receiving classified occupancy maps with walls, clutter, free, and unexplored space classified as described above, or otherwise determined. The output involves a series of continuous line segments representing entire walls within the environment and a series of polygons representing clutter. This approach involves continuous optimization to combine sequences of line segments extracted from occupancy map pixels. The continuous optimization ensures that the wall segments that are extracted are ordered and connected, providing a clear understanding of the layout. In some examples, additional processing may provide for heuristics to adjust the floor plan. For example, in real life, walls do not meet at 89.45 degrees but instead meet at 90 degrees, 0 degrees, or 45 degrees, most often. An assumption of preferred angles when extracting walls aids in generation of a floor plan that may match a user expectation of the space. Additional heuristics include parallelism and symmetry. For example some walls are not connected but are on opposite sides of a room and can be assumed to be parallel based on this relationship. In some examples, the heuristics, assumptions, and examples described above may be combined using a weighting a cost function so as to smooth the sequences of line segments and resolve contradictions between the assumptions or heuristics.

In typical systems, a user has the option to perform basic geometry editing of a floor plan. An alternate mechanism for users to provide input about the rooms in the floorplan may include telling a robot with speech recognition capabilities, the current location (e.g. "Robot, you are in the Living Room"). Such a tour of the environment provides an opportunity for a user to provide hints and input that inform the floor plan system about how the user perceives and conceives of the environment, which may not align with an initial automatic segmentation of a floor plan. The failure of a typical system to align the segmentation of the floor plan with the user's understanding and conception of the environment causes friction as the user may wish to instruct an AMD with a location-specific assignment that may be incorrectly carried out due to differences in understanding of the floor plan. Additionally, graphical user interface manipulation of a floor plan may be difficult for a user to initially input and be time consuming. Furthermore, such manually input notes and segmentation may not be propagated easily through updates to the floor plan as a result of changes to an occupancy map.

After an initial automatic room segmentation of the floor plan, the floor plan system may incorporate user-provided room hints to refine the room segmentation. During a tour of the environment, for example as part of an initial setup of the AMD, the user may provide hints as described above regarding the environment to identify rooms, place markers, and add metadata. The additions may be provided by uttered commands, for example "This room is the kitchen," with the AMD placing a marker in the present location and tagging with metadata associated with the room identity. Using the placed markers and the information provided by the user, the floor plan system may update the automatic room segmentation of the floor plan to redefine boundaries of rooms based on the inputs provided by the user during the tour. Such changes and segmentation may be implemented and stored by the floor plan system, which may propagate the changes throughout a fleet of AMDs. Using this system, the user may communicate their understanding of the environment and thereby cause the floor plan system to more accurately reflect the user's understanding of the environment without requiring time intensive user-inputs on a graphical user interface.

As part of floor plan life-cycle, at some point, the floor plan may become corrupt. Reasons for corruption may include user-edits that may cause problems; bugs; lack of robustness of algorithms; external inputs; etc. The consequences of having a defective floorplan is that many algorithms of the floor plan system may no longer work, which causes user inputs, updates, and revisions to the floor plans to be ignored and/or leaves visual artifacts within the floor plan that don't exist within the physical environment. The floor plan system is capably of repairing floor plans and thereby preventing the issues described above. The floor plans stored by the floor plan system include collections of geometric entities represented by polygons and lines and includes semantic meanings, for example related to an occupancy map describing the environment in terms of walls and clutter. Typical algorithmic repair systems are capable of repair of individual polygons, but not large collections of polygons that include semantic meanings and metadata. A floor plan may be represented as a region defined by polygons, with errors such as self-intersection and overlap possible between adjacent regions of the floor plan. Initially, the floor plan system divides the floor plan, or a subsection of the floor plan into polygons, for example through Delaunay triangulation. The Delaunay triangulation divides the region into triangles such that no point defining a vertex of the floor plan geometry is within any triangle formed by the triangulation. Following the triangulation, region labels associated with the floor plan (e.g., room labels, clutter identities, etc.) are applied to each of the triangles of the triangulation. The label application may be applied via rasterization or triangle sampling. After the labels are applied, a graph-cut algorithm is used to separate the regions according to the labels applied to each triangle. The graph-cut algorithm may also resolve ambiguities of labelling any of the triangles. The final boundaries of each region (without self-intersection, overlap, or other errors) are then extracted based on the labeling of the triangles.

Having now discussed examples of the systems and methods described herein, FIG. 1 illustrates an example environment 100 and an example autonomous mobile device (AMD 102) within the environment 100. The environment 100 in which the AMD 102 is located may be a home or other premises (e.g., an office, a hotel, a facility, etc.), or any similar environment. Such an environment 100 may include a floor 104, which may be a human-made floor, such as a floor 104 made of wood, concrete, carpet, or the like. In some examples, the floor 104 in the environment 100 may be the ground of the Earth itself (natural terrain), such as dirt, gravel, sand, grass, or the like. FIG. 1 depicts an example environment 100 in the form of a house, which includes a human-made floor 104 that is substantially planar (flat), as well as other traditional household objects and features, such as walls, furniture, and the like. Other objects may exist within, and/or move about, the environment 100, such as people, pets, other AMDs, or the like. In addition, people and/or pets may periodically move inanimate objects (e.g., toys, clothes, etc.) about the environment 100, thereby changing the environment 100.

FIG. 1 depicts the AMD 102 in the form of a household robot. It is to be appreciated, however, that the AMD 102 described herein is not limited to a household robot, such as the robot depicted in FIG. 1, or even a land vehicle. For example, the AMD 102 may be an unmanned aerial vehicle (UAV) (e.g., a "drone"), an amphibious vehicle, an underwater vehicle, etc. Additionally, or alternatively, the AMD 102 can include wheels, legs, tracks, and/or other output devices/mechanisms to move (e.g., propel, turn, etc.) about the environment 100. Example AMDs 102 include, without limitation, household robots, industrial robots, automotive robots, surveillance robots, and the like. The terms "autonomous device," "autonomous vehicle," "autonomous mobile device," "autonomous electronic device," "autonomous robot," "mobile robot," "home robot," and "household robot" may be used interchangeably herein to describe any suitable type of AMD, such as the AMD 102, that is configured to perform one or more tasks autonomously, such as moving about an environment (or a space), such as the environment 100. In some examples, the AMD 102 may include other functionality in addition to autonomous movement. For example, the AMD 102 may function as a speech interface device that is configured to process speech (e.g., spoken utterances from people in the environment 100). Additionally, or alternatively, the environment 100 may include one or more secondary devices (e.g., Internet of Things (IoT) devices and/or smart home devices like thermostats, lights, refrigerators, ovens, etc.) that may be controllable by the AMD 102. Accordingly, the AMD 102, in some examples, may be network-enabled (e.g., wireless) and configured to connect to a remote system and/or to one or more secondary devices in the environment 100, such as by connecting to a network (e.g., the Internet, a wireless local area network (WLAN), a cellular network, etc.) and/or by using a short-range wireless protocol, like Bluetooth®, Zigbee®, etc.

As shown in FIG. 1, the AMD 102 may include a body 106. The body 106 may provide structure to the AMD 102. For example, the body 106 may be, or include, a frame, a housing, compartments, and the like. In some examples, the body 106 can be a unitary piece of material (e.g., an injection molded, monolithic body), while in other examples the body 106 may be, or include, an assembly of various parts and components, such as mechanical components, electrical components, and so on. Various component parts of the body 106 may be coupled together using fasteners (e.g., screws, bolts, pins, etc.), adhesive (e.g., glue, tape), and/or various component parts may be press fit or snap fit together. It is to be appreciated that some parts of the AMD 102 may be external to the body 106, the outer boundary of the body 106 defined by a housing, and that other parts of the AMD 102 may be internal to the body 106 (e.g., disposed within the housing). The body 106, or portions thereof, may be made of any suitable material or combination of materials including, without limitation, metal, plastic, rubber, glass, etc. Furthermore, the form factor of the AMD 102 may vary depending on the application. In the example of FIG. 1, the AMD 102 may be about the size of a small dog (e.g., about 420 millimeters (mm) in length, about 250 mm in width, and about 440 mm in length). It is to be appreciated, however, that the techniques, devices, and systems described herein can be implemented in larger or smaller form factors of AMDs.

As shown in FIG. 1, the AMD 102 may further include a mapping subsystem 108 that is utilized, at least in part, for floor detection and occupancy map generation. The mapping subsystem may receive data from one or more sensors, such as a lidar component 110, such as a LIDAR sensor, that is coupled to (e.g., mounted to, in, or on) the body 106 of the AMD 102. For example, the LIDAR component 110 can be mounted onto a platform within the body 106 (e.g., using fasteners, adhesive, press fit or snap fit parts, etc.), the platform being a part of the body 106 that supports the LIDAR component 110. In some examples, all or a portion of the LIDAR component 110 may be disposed within (or internal to) the body 106. Accordingly, at least some of the LIDAR component 110 may be hidden from view when looking at the AMD 102 from an external point of view, except that a small portion of the LIDAR component 110 may be visible through a light-transmissive (e.g., transparent) window(s) and/or an aperture(s) (e.g., a slot) defined in the body 106. The LIDAR subsystem 108 is shown as being positioned at a front side of the AMD 102 (or body 106). The "front" (or "front side") of the AMD 102 may be a side of the AMD 102 facing the forward direction of travel in which the AMD 102 is configured to move.

The LIDAR component 110 is configured to emit light 112, and to detect at least a portion of the light 112 that is returned from (e.g., reflected by) objects in the environment 100. Based on the light that is returned to, and detected by, the LIDAR component 110, the LIDAR component 110 can output distance data indicative of a distance(s) (or range(s)) from the LIDAR component 110 to one or more points in the environment 100. In this case, these points are on the floor 104 below the AMD 102 because the light 112 is directed towards the floor 104, as depicted in FIG. 1. The mapping subsystem 108 provides the AMD 102 with occupancy map data describing the environment in terms of presence or occupancy of locations within the environment. The mapping subsystem 108 may be configured to produce an occupancy map of the environment based on data from the lidar component 110 or other environment detecting systems that may be used in place of or in addition to the lidar component 110.

The AMD 102 is in communication with a remote computing system 116. The remote computing system 116 may include a cloud computing device in network communication with the AMD 102. The remote computing system 116 may be hosted at a remote location, may be hosted local to the environment 100. The remote computing system 116 includes a mapping subsystem 118 that may be used to produce one or more maps, such as occupancy maps, floor plans, etc., and may perform one or more operations of the mapping subsystem 108 of the AMD 102. The remote computing system 116 also includes a floor plan subsystem 120 that may be configured to perform one or more operations as described herein. In some examples the floor plan subsystem 120 may be embodied in multiple different computing devices, including on the AMD 102 as well as the remote computing device 116.

The floor plan subsystem 120 may receive occupancy data, such as an occupancy map from the mapping subsystem 108 and/or mapping subsystem 118 and may generate a floor plan that may be shared among multiple devices, update a floor plan, provide semantically meaningful floor plan layouts, and repair floor plans. The floor plan subsystem 120 described herein is configured to generate a single format and maintain a single floorplan layout of an environment that may be accessed and used by one or more AMDs operating within the environment. The floor plan subsystem 120 may provide a visualization of the floor plan or other data stored therewith for access and use by various systems, for example to provide a visualization of a space at a user device, such as a mobile computing device. The floor plan may be generated by the floor plan subsystem 120 that receives occupancy map data, lidar data, or other environmental data from a mapping subsystem 108, mapping subsystem 118, and/or AMD 102 and generates a floor plan while also enabling updates, repair, automatic tagging, user-provided tagging, and additional metadata to aid in use by the one or more AMDs. The floor plan subsystem 120 provides for automatic segmentation of an occupancy map to determine geometries for different rooms, providing an update to the floor plan based on an update or change to an occupancy map received by an AMD in communication with the floor plan subsystem 120, and repair of floor plans.

The floor plan subsystem 120 may be embodied in software or processor-executable instructions at the remote computing device 116 and is used to represent and store the physical spatial environments (e.g. floor plan) and spatial objects in the environment 100. The floor plan subsystem 120 provides for a schema and model for representing spatial objects (e.g. a room), geometries or shapes of spatial objects (e.g. the shape of room A is square), spatial object metadata (e.g. the name of room A is "kitchen", home monitoring is disabled in room A), typed connections or relationships between spatial objects (room A is connected to room B via door C), edits or changes to spatial objects (e.g. create a new room named "kitchen", change the shape of room A from square X to square Y), and attribution of changes to spatial objects (e.g. the shape of room A was changed by customer Z and device A). The floor plan subsystem 120 includes local and remote (e.g., cloud-based) systems for storing spatial objects, modifying spatial objects, syncing spatial objects between cloud- and device-based floor plan systems (e.g., maintaining a consistent spatial object floor plan across a fleet of AMDs). The floor plan subsystem 120 includes components for communicating via the remote computing system 116, reading the floor plans, providing updates to floor plans, and providing repairs to the floor plans that may be propagated across one or more AMDs 102.

Figure 2:
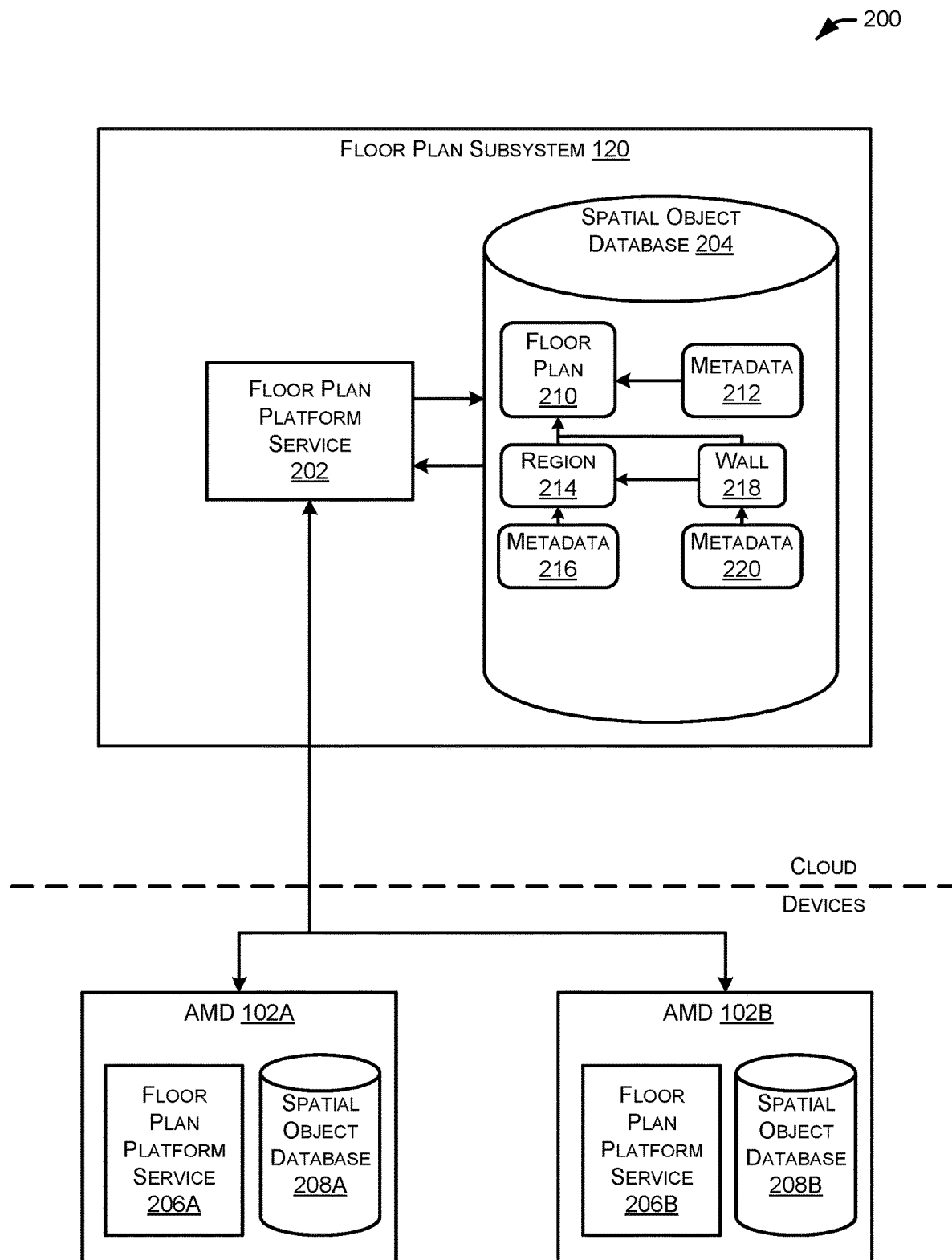
FIG. 2 illustrates a block diagram of a system architecture for a floor plan subsystem, according to the present description.

FIG. 2 illustrates a system diagram 200 for a floor plan subsystem operating in a cloud environment and communicating with multiple AMDs 102. In some examples the consumers of data from the floor plan subsystem 120 may include devices other than AMDs such as mobile computing devices, camera devices, digital personal assistants, services (such as a visualization service), and other such devices and systems. The system diagram 200 includes the floor plan subsystem 120, which may be embodied in the remote computing device 116 of FIG. 1 and/or in a cloud computing system. The floor plan subsystem includes a floor plan platform service 202 that stores spatial objects and provides interfaces for communicating with AMDs 102A and 102B (collectively AMDs 102. The floor plan platform service 202 may also include components for processing occupancy maps to generate floor plans, update floor plans, and repair floor plans as described herein, in addition to extracting information related to walls (e.g., wall data 218 indicating locations and orientations of walls in the environment) and region data (e.g., region data 214 indicating identities and information regarding rooms or identified regions of the environment). The floor plan platform service 202 may include communication interfaces for passing data and signals between the floor plan subsystem 120 and the AMDs 102. The floor plan subsystem 120 also includes a spatial object database 204 that stores floor plans 210, region data 214, wall data 218, and metadata 212, 216, and 220. The spatial object database 204 may also include information related to clutter, viewpoints for AMDs (e.g., a location and direction for an AMD to position itself for monitoring or other purposes), and other spatial data related to floor plans. The metadata 212, 216, and 220 may include metadata describing identifiers of walls, regions, or objects, and may also include information relating to user-provided information. The spatial object database 204 may store information relating to the floor plans in any suitable format for access and use by a system of the AMDs 102. The data stored in the spatial object database 204 may be based on a standardized data structure that may include an open source data structure, proprietary data structure, or other data structure capable of being used by various systems in communication with the floor plan subsystem 120. Additionally, the floor plan subsystem 120 may be capable of receiving floor plans and other data in various formats and interpreting the data from such received files into the standardized data structure used by the floor plan subsystem 120.

The floor plan platform service 202 may include a particular format for floor plan data in addition to a common schema for storing additional data such as clutter, region, metadata, and other such data and associations. The floor plan platform service 2020 may be extensible to include additional relationships and types of data as they are provided or consumed by devices.

In some examples, the floor plan data 210 may include one or more floor plans and/or floor plans with one or more layers including different layers. For example, the floor plan data 210 may include multiple floor plans as well as a transformation required to get from one floor plan to a second floor plan. In some examples the floor plan data 210 may include different layers or floor plans that include different levels of data and may be consumed by different systems and devices based on their data needs and uses, for example with AMDs 102 using a detailed layer with wall, clutter, and region data while a personal digital assistant may access a floor plan subset or layer that only includes walls and regions.

The AMDs 102 may be examples of the AMD 102 of FIG. 1 and may include components and subsystems as described with respect to AMD 102 of FIG. 12. The AMDs 102 include spatial object databases 208A and 208B that may store information and data similar or identical to that stored in the spatial object database 204. In some examples, the floor plan platform service 202 updates and synchronizes the spatial object databases 208A and 208B with the spatial object database 204 to ensure consistency in spatial object data (e.g. clutter, wall, and floor plan data) across the entire system. The AMDs 102 may be accompanied by other devices and systems as described above and may also include devices that convey different types of data for the floor plan platform service 202 including grid maps, point cloud data, polygon mesh data, etc.

The floor plan subsystem 120 produces a representation of the environment and stores it as a floor plan as floor plan data 210. Multiple AMD's 102 may operate within a single environment and may provide data (e.g., occupancy map data) to the floor plan subsystem 120 that may be used to generate a shared floor plan that represents a single shared map of the physical environment. The single shared map may include multiple layers, for example with layers describing a basic floor plan including only walls, a separate layer including clutter, a third layer including region data (e.g., room identifiers), a fourth layer including restricted regions, and other layers with additional data relating to the floor plan that may be gathered or otherwise received either from the AMDs 102 or a user. The single shared floor plan aids different AMDs that communicate together to enable additional uses cases or enhance existing use cases. For instance, enabling voice commands from users based on a user understanding of the environment as provided to a first AMD 102A that may be used to process voice commands received at a second AMD 102B. Additionally, storing data such as floor plans, metadata, wall data, and region data at a central database reduced duplication and potential duplication errors causing problems across platforms and devices.

In practice, the AMDs 102 and/or the floor plan subsystem 120 produces an occupancy map describing rough occupancy of the environment at a high level (e.g., occupied, unoccupied, or unobserved). The floor plan subsystem 120 receives the occupancy map from one or more AMDs 102 and extracts a set of floor plan edits, as described with respect to FIG. 3 below. The extracted edits may include additional objects, additional data for previously unexplored regions, repairs, and other such changes to existing floor plan data 210. The edit may specify a creation, update, or deletion of a spatial object, which may include a wall or clutter, or a creation, update, or deletion of a floor plan (e.g., a creation of a new floor plan, creation of a new region or "room" with a label, addition of a room, revisions to walls of existing rooms, etc.). The edits may be processed by the floor plan platform service 202 to make instructed changes to the floor plan data 210 and any additional data or metadata including to the region data 214 and/or the wall data 218. As part of processing by the floor plan platform service 202, algorithms for wall extraction, clutter identification, noise removal, transformation, and other such algorithms, including those described herein, may be applied to the floor plan data 210 to extract wall data 218, region data 214, and ensure preservation of metadata across updates to the floor plan data 210. After making adjustments or edits to the floor plan data 210, the floor plan platform service 202 synchronizes the new floor plan to the AMDs 102. In some examples, the floor plan platform service 202 may also manage permissions and restrict or allow edits based on permissions granted to particular devices or users. For example, a particular device may be considered untrustworthy or unreliable and therefore may be restricted from providing certain types of updates to the floor plan data 210 to prevent corruption of the floor plan data 210. Some devices may have permission to edit shapes and spaces within the floor plan while a second set of devices may have permission to name objects, place viewpoints, name regions and rooms, etc.

Figure 3:
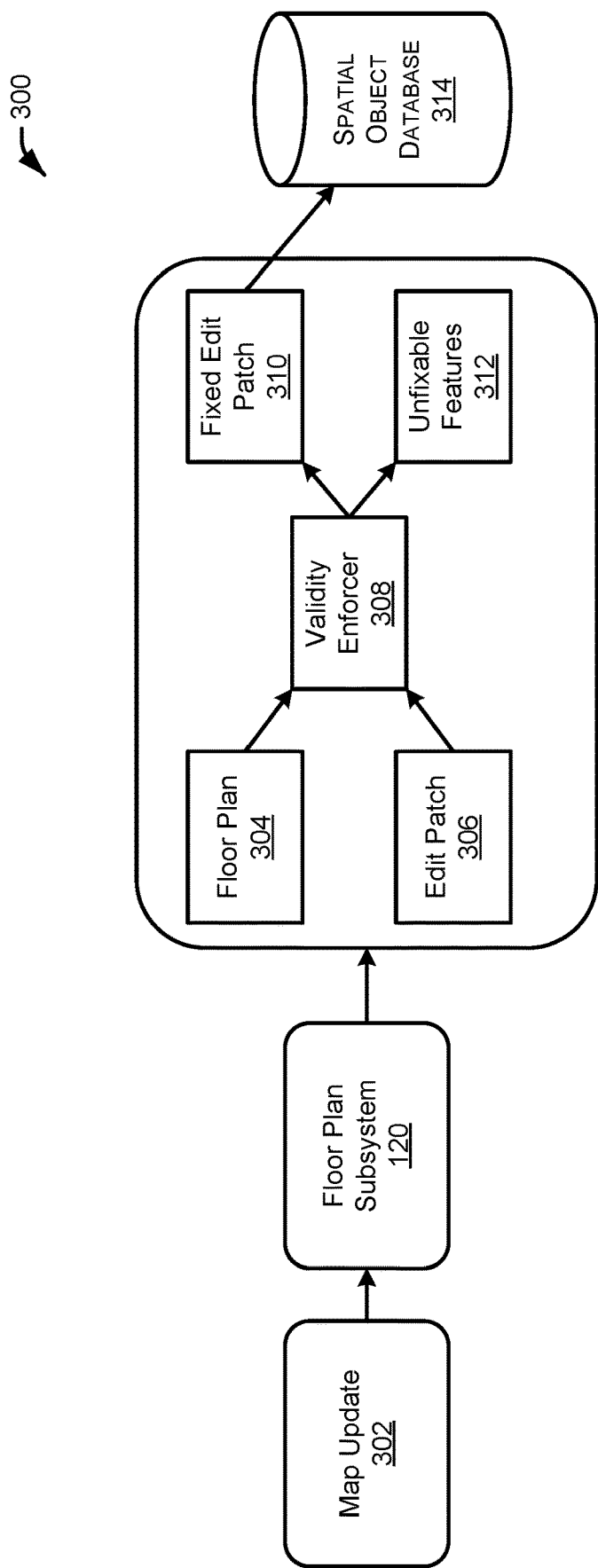
FIG. 3 illustrates a block diagram 300 for a floor plan edit applied to floor plan data based on updates from a user update or AMD update, according to the present description.

FIG. 3 illustrates a block diagram 300 for a floor plan edit applied to floor plan data based on updates from a user update or AMD update. The block diagram 300 illustrates a process that may be performed at or by the floor plan subsystem 120 of FIG. 1 or 2 and/or the floor plan platform service 202 of FIG. 2 for applying updates to a floor plan. Initially, a map update 302 is received at the floor plan subsystem 120. The map update 302 may include occupancy data such as an occupancy map from one or more AMDs 102 or may include user-provided data, such as semantic data describing information related to the floor plan. In some examples, the map update 302 may include additional regions, such as previously unexplored data on an occupancy map. In some examples, the map update 302 may include changes to an occupancy map. The map update 302 may include data describing the update to the occupancy map or floor plan in some cases. In some examples, the map update 302 includes the occupancy map but does not include or describe the updates and instead includes all the data from the source. The map update 302 may be determined based on a comparison between the received data and the existing floor plan data. The block diagram 300 ensures that floor plans are maintained as geometrically and semantically valid as updates are processed from multiple different sources. Otherwise, the floor plan may begin to have overlapping or interfering geometries or other inconsistencies that may render the floor plan inaccurate or unusable by the AMDs 102.

The floor plan subsystem 120 may include a validity enforcer 308 that receives the map update 302 as an edit patch 306. The edit patch 306 may include identical information to the map update 302 or may include different data. For example, the edit patch 306 may include instructions to produce the edits over the existing floor plan data (for example to add walls, remove a portion of a wall for a door, add a region, updates to locations of clutter, etc.). The validity enforcer 308 receives the floor plan 304, which includes the existing floor plan from the floor plan subsystem 120, e.g. the floor plan propagated through the system of FIG. 2, and also receives the edit patch 306. The validity enforcer 308 ensures that the edit patch 306 results in geometric consistency. The geometric consistency ensures that different AMDs 102 may continue to use the floor plan without issue and without corruption of the floor plan. Additionally, the validity enforcer 308 ensures that updates from an unreliable or malfunctioning device do not negatively impact the performance of other AMDs 102 and the stored floor plan used in the system. The validity enforcer 308 may operate using a set of rules to identify edits and verify edits to be applied to the floor plans. In some examples, the validity enforcer 308 may implement one or more algorithms or artificial intelligence based systems for performing the operations of the validity enforcer 308.

The validity enforcer 308 may analyze the edit patch 306 to identify valid polygons in the resulting floor plans, for example to avoid self-intersection or incomplete polygons resulting in "open" geometry. In such an example, the validity enforcer 308 may output a fixed edit patch 310 including changes to the edit patch 306 to convert any self-intersecting polygons to valid non-self-intersecting polygons. The validity enforcer may also identify geometry overlaps between regions or spaces in the floor plan and prevent overlaps by reconciling the boundary between the regions. Similarly, the validity enforcer 308 may ensure that spaces are assigned to regions (rooms) without leaving spaces unaccounted for within the floor plan. In some examples, unfixable features 312 may be output in a notification or returned to the source of the map update 302 indicating unfixable features that the validity enforcer 308 is unable to reconcile with the floor plan and therefore cannot be used to update the floor plan.

The fixed edit patch 310 may be communicated to a spatial object database 314 that may be an example of the spatial object database 204 of FIG. 2. The fixed patch edit may be applied to information stored in the cloud as well as on one or more devices in communication with the floor plan subsystem 120. In some examples, the validity enforcer 308 may communicated the fixed edit patch 310 to the floor plan subsystem 120 which may then update floor plans in a network across multiple AMDs and other devices that may consume floor plans for various purposes, including devices other than AMDs such as digital personal assistants, etc.

FIGS. 4A-4D show a series of floor plans illustrating a process for segmenting a floor plan into regions for room geometries. The process may be performed on the AMD 102 or at a remote computing device 116 in communication with the AMD 102. The process shown in FIG. 4 may be performed by the floor plan subsystem to automatically segment the floor plan to determine geometries for different regions (e.g., rooms) within the floor plan. Additional user-provided inputs, such as during a tour of the environment, where the user may verbally provide information relating to the identity of different regions, may be used to refine the automatic segmentation of regions.

The map 402 includes a floor plan 404, such as a floor plan that may be generated by the floor plan subsystem 120. The floor plan 404 includes several rooms within a space, not yet identified with the floor plan 404 at FIG. 4A. In some examples, noise may initially be removed by processing the map data using a denoising algorithm. Initially, an occupancy map may be received at the floor plan subsystem 120 including occupancy data for the environment. The occupancy map is initially sorted into walls and clutter. The walls and clutter may be determined based on heuristics such as described herein or based on object recognition techniques. After recognizing the clutter and the walls within the occupancy map, the floor plan subsystem 120 may remove the clutter from the map to produce the floor plan 404 of FIG. 4A.

In some examples, before identifying the walls and clutter, a denoising process may be performed that favors pixels of the occupancy map labeled as occupied. At the end of the denoising process, the majority of bleeding and noise is removed from the occupancy map. The cleaned up occupancy map may then be processes using several heuristics to perform the wall/clutter determination. The heuristics include computing a ratio, for the denoised occupancy map, between an area of an object within the occupancy map and the convex hull of the object. Such a ratio is low for walls which have a small area and a large convex hull while clutter will have a larger area to hull ratio. Another heuristic includes computing a ratio between a bounding box width and height for the object within the occupancy data. The ratio is low for walls that are narrow and long and high for objects that have closer to a square area. Another heuristic includes computing an area of the object, with the area of walls expected to be below a threshold due to the narrow nature of walls within environments. An additional heuristic includes computing eigenvalues for each pixel of the objects to determine a line score. The line score corresponds to a likelihood that the object is a line. Objects having a line score above a threshold may be considered walls. For objects with line scores above the threshold, a line segment may be extracted by determining pixels that fall within the line as defined by the occupied pixels. Additional heuristics may involve detecting known shapes in the occupancy map and classifying them accordingly. For example, a bed of a king or queen size is expected to have a particular shape (rectangular) and size (based on dimensions). Such shapes may be identified and assigned as clutter based on the item identification.

At FIG. 4B, the floor plan subsystem 120 determines region center candidates 406 within the floor plan 404. The region center candidates 406 may include possible center locations for regions within the floor plan. The region center candidates 406 identify potential centers for regions within the geometry that may correspond to rooms, with one region center for each region. In some examples, the region center candidates 406 are determined based on computing a distance for every unoccupied cell within the occupancy map (enclosed within the geometry of the floor plan) to a nearest wall. After determining a distance to a nearest wall for each unoccupied cell, the local maxima may be identified and selected as the region center candidates 406. In some examples, other methods may be implemented to identify region center candidates 406 such as machine learning methods and other such image processing techniques.

At FIG. 4C, the floor plan 402 within the map 402 is initially divided into region geometries. The region geometries are identified based on the region center candidates 406, with one region center candidate 406 assigned to each region. The regions are defined by introducing regions boundaries 408 between each of the region center candidates 406 such that the region boundaries and the walls of the floor plan 404 define the regions. In some examples, the regions may be determined based on inserting a boundary at a halfway point between region center candidates 406. In some examples, the regions may be identified based on a watershed algorithm computation or other image processing technique. In the watershed algorithm computation, the region center candidates 406 may be selected as seed locations for the sources of "water" with the boundaries 408 defined as the locations of the intersections of "water" emerging from adjacent region center candidates 406. In some examples there may be more region center candidates 406 than regions within the floor plan that a user may typically associate with the space. For example, in FIG. 4C there are four regions in a central hallway that a user is likely to associate with a single region rather than four different regions.

In FIG. 4D, the floor plan 404 is shown with reduced numbers of regions. For example, four regions from FIG. 4C may be merged to form region 424. The region center candidates 406 may be reduced to the region centers 412 with one region center 412 for each region 414, 416, 418, 420, 422, and 424 with some boundaries 408 removed to leave boundaries 410 between regions 414, 416, 418, 420, 422, and 424. The reduction in regions may be performed by post-processing to iteratively merge small rooms with adjoining rooms. For neighboring regions a plurality of points (e.g., 100 points) within the region are selected to check visibility with a plurality of points in the adjacent region. If more than a threshold number of points (e.g., greater than 70 percent, greater than 80 percent, or greater than 90 percent) have visibility with points in the adjacent region then the two regions may merge.

In some examples, additional data may be used to select the region centers 412 from the region center candidates 406. For example, user-provided inputs such as region labels provided by the user may be used to identify a number of regions as well as locations of the regions. In an illustrative example, during a tour of the environment, the user may provide region labels verbally to the AMD 102 which may receive the verbal label and also record the location where the verbal instruction is received. The region labels and the associated locations within the floor plan may be used to identify region centers 412 based on proximity to the locations of the provided labels.

In some examples, after or while providing region labels during the tour of the environment described above, the location of the label may be used as a seed location for a region, independent of the region center candidates 406. In some examples, the region center candidates 406 may be determined, at least in part, based on region labels provided during the tour in addition to or in the alternative of the local maxima process described above.

The floor plan 404 of FIG. 4D may be stored by the floor plan subsystem 120 and may be updated to AMDs 102 in communication with the floor plan subsystem 120. In some examples, the floor plan 404 of FIG. 4D with the identified regions may be layered, associated with, or repopulated with clutter data from the occupancy map. The clutter data may be stored at the floor plan subsystem as described above as a layer or optional information that may be provided to one or more AMDs 102.

FIGS. 5A-5D show a series of floor plans illustrating a process for automatically segmenting a floor plan into regions for room geometries based on user-provided labels during an environment tour. During a tour, the user may verbally or otherwise, indicate marker locations and data associated with the marker, for example a marker may be placed by telling the AMD 102 that "this room is the kitchen." The location of the AMD 102 may determine the location of the marker while the metadata may include the label "Kitchen" associated with the user placed marker. As described above with respect to FIG. 4, the user-placed markers may be used as additional data for automatic segmentation of the floor plan into regions.

FIG. 5A illustrates a map 502 that includes a floor plan 504 without regions or defined boundaries between regions. FIGS. 5B, 5C, and 5D illustrate different boundary regions that may be defined, among others, within the floor plan 504 based on different criteria for region segmentation.

FIG. 5B illustrates a first segmentation of floor plan 504 with regions 506, 508, 510, 512, and 514 divided within the floor plan 504. The regions may be automatically segmented according to the processes described with respect to FIGS. 4A-4D in some examples. In some examples, a marker may be placed in a center of region 506 during a tour of the environment indicating a certain room identity. Based on the placement of markers in each of the regions of FIG. 5A, the regions may be divided accordingly. In some examples, heuristics may be applied during automatic segmentation to determine region geometry. For example, regions may be defined based on heuristics that determine a length to width aspect ratio of regions with a preference or weighting based on an aspect ratio closer to a square (e.g., an aspect ratio approaching 1) versus an aspect ratio indicating a thin room. In some examples, heuristics may also apply to define region boundaries along vertical and horizontal defining axes, as most regions may be understood by users according to such linear boundaries. Additional heuristics may be based on clutter or objects remaining within a single regions rather than traversing boundaries between regions. In some examples a space or regions may be defined so it includes nor more than a threshold number of large objects, for example with a living room defined to include nor more than five large pieces of furniture that may be associated with large chairs and couches. In some examples, heuristics may be based on convexity of a region, which may be defined as a convex envelope that encloses the region, with convex envelopes providing a smallest convex perimeter to surround a region. In some examples, the heuristics and/or additional rules used to define regions within the floor plan may be balanced against one another through the use of a cost function that generates a room score for a particular regions based on balancing each of the applied factors and/or heuristics with a weighting function. In some examples room definitions and regions boundaries may be applied based on a maximization or optimization of such a room score function. In some examples a machine learning algorithm may be trained to identify a room score after being trained using data tagged with examples of the heuristics described herein and regions having room scores above a threshold may be selected for use in the floor plan.

FIG. 5C illustrates a second manner of segmenting the floor plan, with different regions dividing region 506 from FIG. 5B. The regions 516 and 518 may divide the region 506 into two regions based on the presence of two different user-defined markers within the region 506. With two user-defined markers within the region 506, the space may be divided according to FIG. 5C or 5D with vertical or horizontal boundaries between the user-defined markers.

Figure 6:
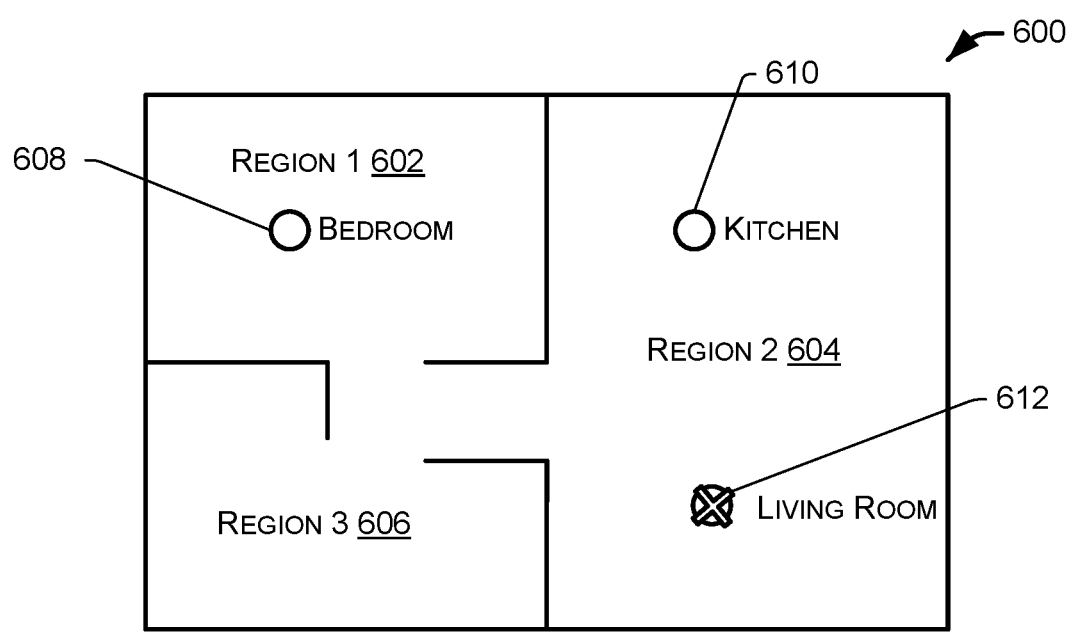
FIG. 6 illustrates an example of user provided markers within a space for automatic segmentation of regions, according to the present description.

FIG. 6 illustrates an example of user provided markers within a space for automatic segmentation of regions. In the example illustrated in FIG. 6, a space 600 includes three regions 602, 604, and 606 as initially defined by an automatic segmentation. Region 602 has a marker 608 and associated label indicating it is a bedroom, region 606 does not have a marker but is defined as a separate region at least due to the walls defining the space. Region 604 is initially segmented as a single region prior to a tour with a user. During a tour, the user may provide a marker 610 with a label for a kitchen. The floor plan subsystem 120 may automatically associate region 604 with the kitchen. The user may subsequently provide a second marker 612 that falls within region 604. Typical systems may reject the second marker 612, however the segmentation performed by the floor plan subsystem 120 may provide an update or edit to the floor plan to indicate that a fourth region should be included within the floor plan around the second marker 612. The floor plan subsystem 120 may then segment region 604 based on the approaches described above to produce a floor plan that matches the understanding of the user within the space without the user manually adjusting boundaries or maps but based solely on the occupancy map of the space and the user-provided markers during the tour.

Figure 7A:
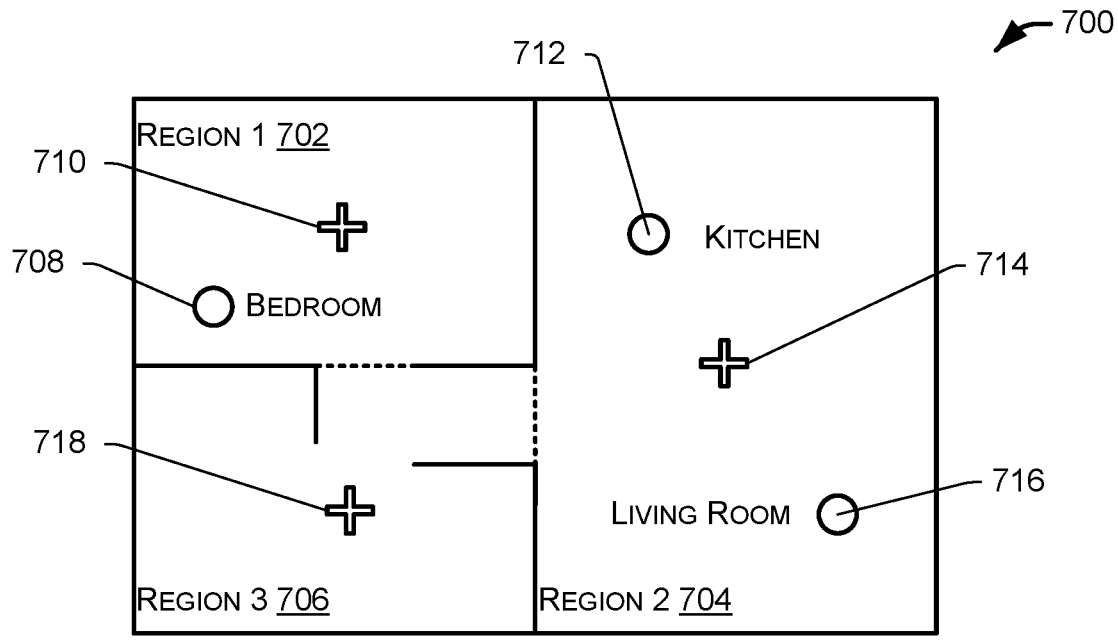
FIGS. 7A-7B illustrate an example of region segmentation of a floor plan based on region center candidates associated with user-provided markers, according to the present description.
Figure 7B:
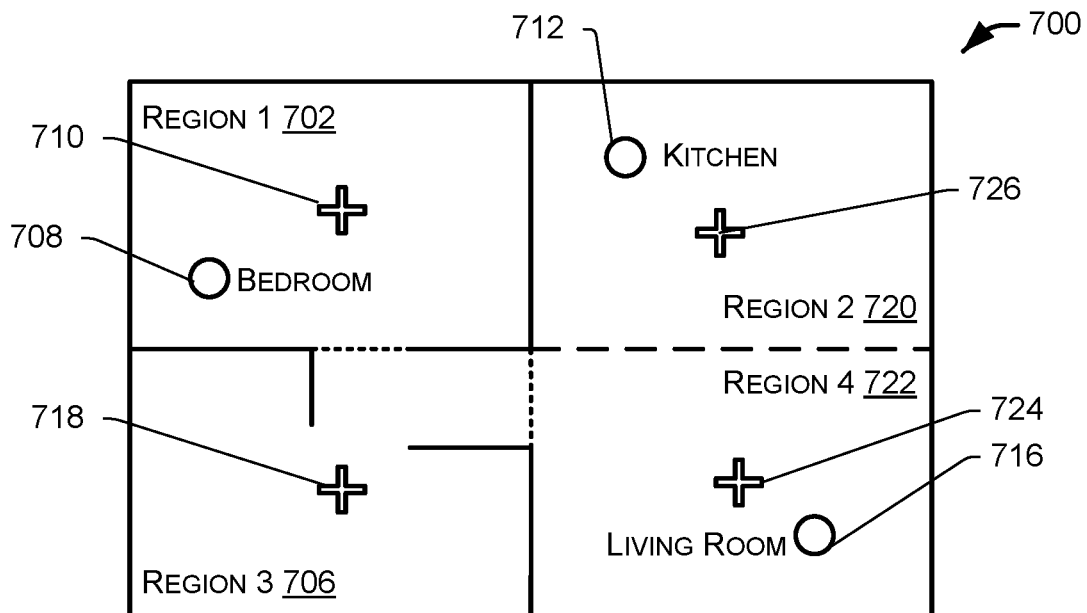

FIGS. 7A-7B illustrate an example of region segmentation of a floor plan based on region center candidates associated with user-provided markers. FIGS. 7A-7B illustrate a manner of resolving the situation presented with respect to FIG. 6 above. The region center candidates described above with respect to FIG. 4 may be refined based on the user markers according to FIGS. 7A-7B.

FIGS. 7A-7B include a space 700 with three regions 702, 704, and 706 initially defined by automatic segmentation of the space 700. The region center candidates 710, 714, and 718 may be determined as described with respect to FIG. 4 above and are placed as shown in FIG. 7A. During a tour of the space 700, the user provides markers 708, 712, and 716 to define at least some of the regions of the space 700. Two markers 712 and 716 are within a single region 704, providing a conflict for floor plan segmentation. To resolve the conflict, updated region centers may be determined based on the user-provided markers, with region center candidates 724 and 726 provided as a result of the determination. The region center candidates 724 and 726 may be determined by performing the local maxima determination described with respect to FIG. 4, while also accounting for two local maxima in the proximity of the user-provided markers 724 and 726. Accordingly, the space 700 may include regions 720 and 722 that divide the region 704 and thereby provides a more accurate reflection of the user's understanding of the space 700.

Figure 8A:
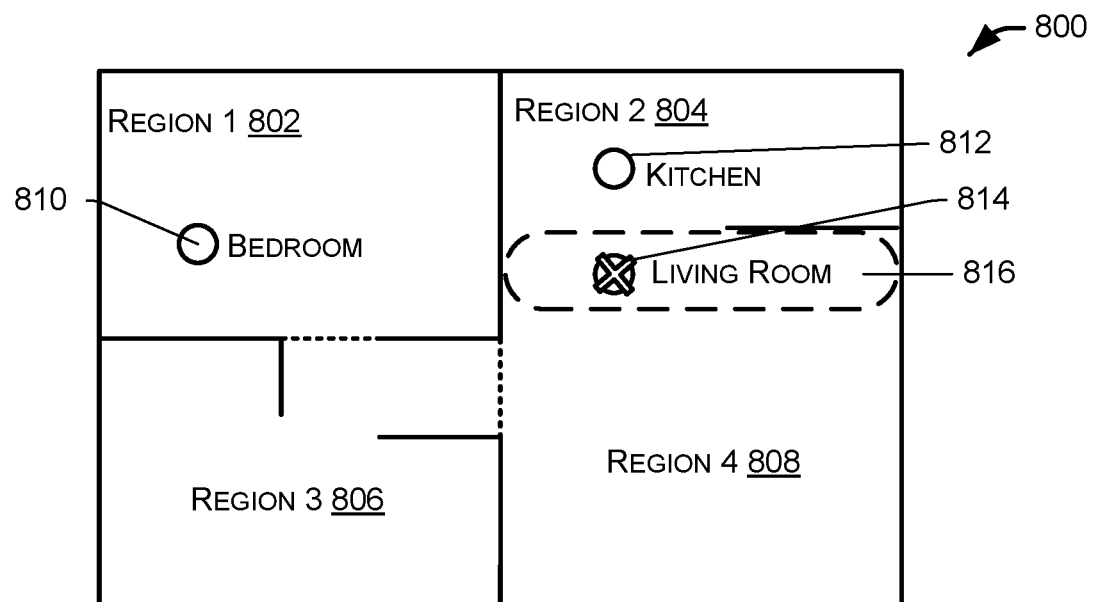
FIGS. 8A-8B illustrate an example of a region segmentation for a floor plan to correct incorrect region geometries produced by a first pass of automatic segmentation, according to the present description.
Figure 8B:
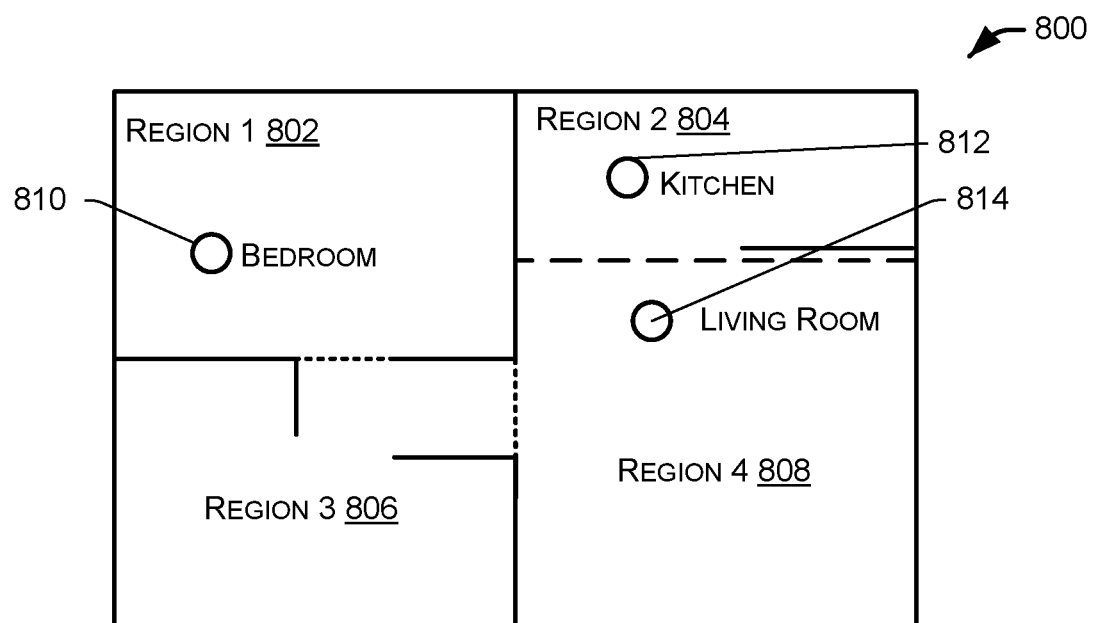

FIGS. 8A-8B illustrate an example of a region segmentation for a floor plan to correct incorrect region geometries produced by a first pass of automatic segmentation. Similar to FIGS. 7A-7B described above, the space 800 includes regions 802, 804, and 806, 808, and 816 initially segmented and user-provided markers 810, 812, and 814. Initially, in FIG. 8A, region 816 may be separate from region 808 based on a user-provided marker 814 that results in region 816 being distinct from region 808. In some examples, the user-provided marker 814 may be used to label the region 808 and also to define a boundary between adjacent regions. For example, as illustrated in FIG. 8B, a boundary between region 808 and region 804 may be nearer to region 804 based on the location of the user-provided marker 814 that is associated with region 808.

FIGS. 9A-9B illustrate an example of a wall update process for updating a floor plane with additional floor plan data. The floor plan subsystem 120 may process updates to floor plans based on occupancy maps received from one or more AMDs 102. The floor plan may be updated based on changes within the environment (e.g., moving furniture or objects), changes in accessibility to regions (e.g., a previously closed door is opened), and improvements to the occupancy map as a result of multiple observations of the environment over time that may resolve and reduce noisy data to provide a cleaner or sharper occupancy map. Updates to floor plans using only occupancy map data as a reference is typically difficult due to errors that accumulate due to sensor noise and incorrect AMD localization. Accordingly, processing an update to a floor plan based on an occupancy map must properly identify correspondence between features in the current floor plan and the updated floor plan and determine coordinate transformations between the current floor plan and the updated floor plan to ensure metadata and other associated data such as region identification is properly mapped to an updated floor plan.

FIG. 9A illustrates a floor plan 900 existing as stored in the floor plan subsystem 120. The floor plan 900 includes walls defined by points 902 and objects within the space defined by the walls. Within the floor plan 900 are markers 904 placed around the space. The markers may be randomly scattered around the floor plan 900 or may be arranged in a pattern and/or regularly spaced within the floor plan 900. In some examples, the markers 904 may be a subset of markers within the space. The markers may be identified based on their locations. The points 902 defining the walls within the current floor plan 900 may be defined based on a distance matrix defining a distance from each of the markers 904. In some examples, a distance from the markers 904 to the objects 906 and 908 may also be used to define the locations of the objects.

FIG. 9B illustrates a floor plan 910 which may be an updated map of the space illustrated in FIG. 9A. The markers 904 are positioned in the same locations and distances to wall points 902 are determined. Corresponding wall points are identified based on their distance to the markers 904 such that wall points may be identified in the new floor plan as corresponding to the existing or previous floor plan, reducing the need to re-generate entire new floor plan data with each update. The markers 904 may also be used to update locations of clutter such as object 906 within the space using the same distance of the markers 904 to the object 906. The walls may be accepted if the distance falls within a threshold distance of each of the markers 904. In some examples, the wall may have segments missing, such as where a door is open, and because no points on the wall exist within the threshold distance, the wall may be updated with an opening. Additional wall points may be positioned around a new space 912 that may also be identified based on their distances to the markers 904. In some examples, wall points may be matched between the floor plan 900 and the floor plan 910 based on a matching of distances to the wall points, indicative that the wall has not moved more than a threshold distance in the updated map thereby indicating that the wall is the same wall as in the previous floor plan. In such cases, the updates may be applied to the floor plan based on the matching of the walls from the markers. Similarly, in some examples, the objects 906 and 908 may be located and identified and/or updated based on matching them with objects from the floor plan based on their distance to the markers 904.

Figure 10B:
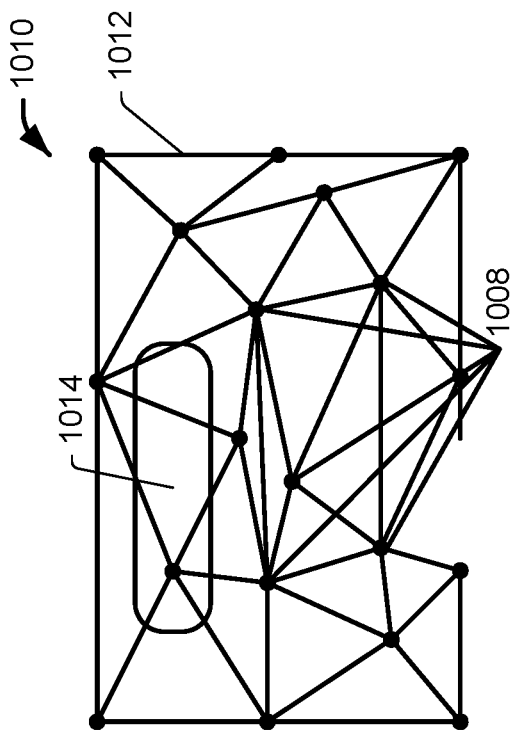
FIGS. 10A-10B illustrate an example of a process for performing a transformation of a previous floor plan to align with an updated floor plan, according to the present description.
Figure 10A:
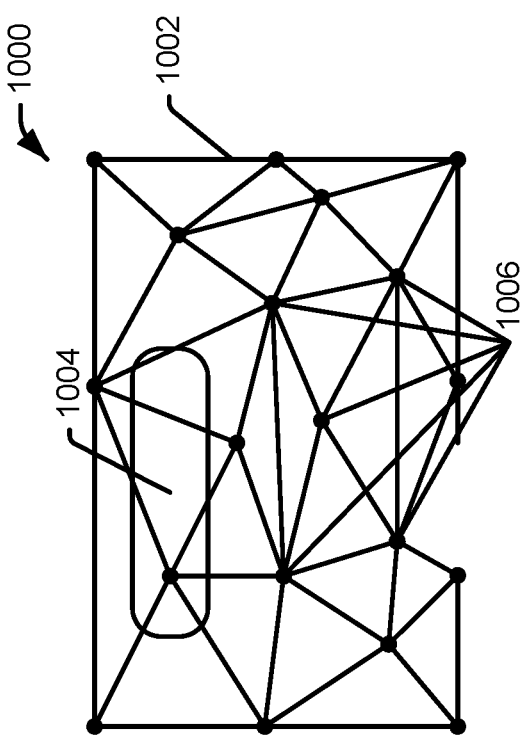

FIGS. 10A-10B illustrates an example of a process for performing a transformation of a previous floor plan to align with an updated floor plan. FIG. 10A illustrates a previous floor plan 1000 with walls 1002, an object 1004, and markers 1006. FIG. 10B illustrates an updated floor plan 1010 including walls 1012, object 1014, and markers 1008. The updated floor plan 1010 may include details or geometry not present in or not as refined as in the updated floor plan 1010. In some examples, the walls of the updated floor plan 1010 may be determined to match with the floor plan 1000 based on a shape matching of the walls. In such examples, simultaneous localization and mapping (SLAM) may be used to update the floor plan. In such examples, scale invariant feature transforms or other similar techniques may be used to match the shapes of the walls before providing the updates to the floor plan. In some examples, SLAM feature matching may rely on matching points with local features. In the case of wall matching, the walls may be matched based on an overall global shape of the floor plan walls. In such examples, a shape context descriptor may match points based on shapes. In such examples, a deformation transform from any pose in the previous floor plan to the updated floor plan may be determined using marker correspondence. Marker correspondence relies on determining a transformation of the previous floor plan 1000 required to align the markers 1006 with the markers 1008 of the updated floor plan 1010. Using the common markers, the previous floor plan 1000 may be triangulated with the updated floor plan 1010. Accordingly a triangle containing interpolated coordinates may be calculated based on the triangulation. The coordinate transform may be computed to align the markers from the previous to the updated floor plan. The transformation may be applied to objects, metadata, regions, and other spatial objects, such as object 1004 within the floor plan or associated therewith to produce the object 1014 or other such data.

Figure 11C:
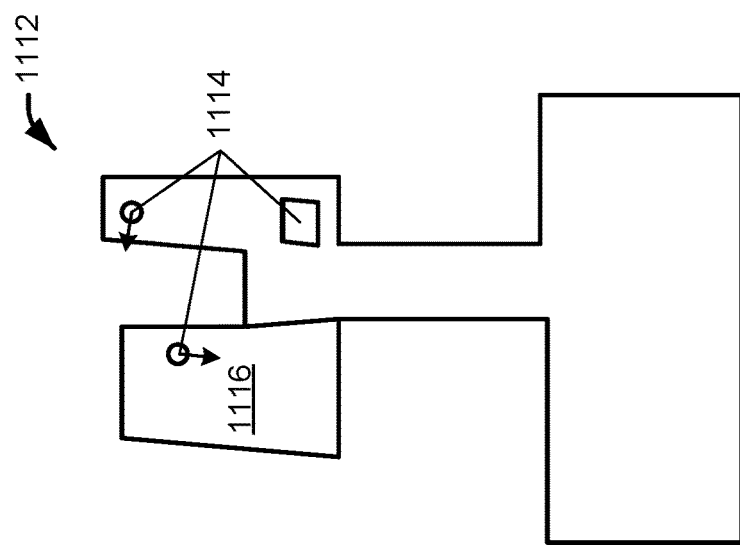
FIGS. 11A-11C illustrate a previous floor plan and updated floor plan with the previous floor plan transformed to map data from the previous floor plan to the updated floor plan, according to the present description.
Figure 11B:
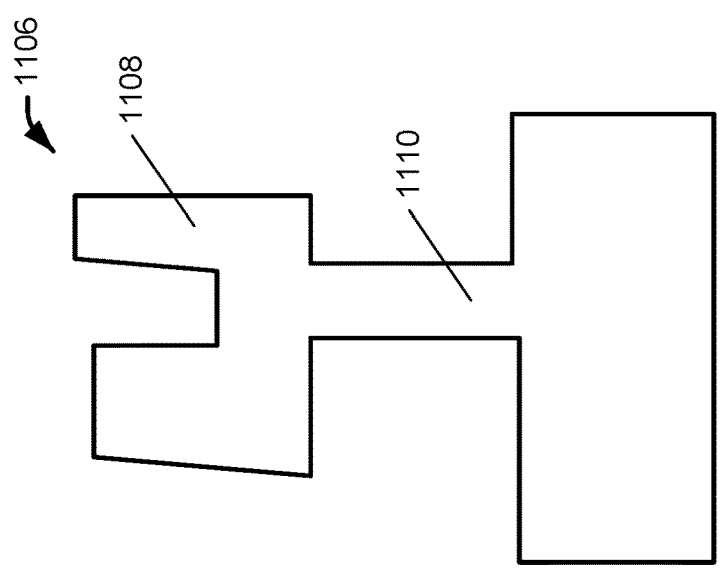
Figure 11A:
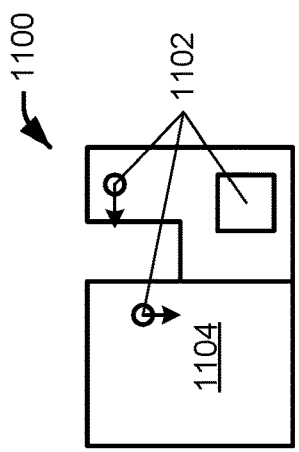

FIGS. 11A-11C illustrate a previous floor plan and updated floor plan with the previous floor plan transformed to map data from the previous floor plan to the updated floor plan. The floor plan subsystem 120 may be used to track positions of regions and other such data across different generations of floor plans (e.g., from a previous floor plan populated with region data and other data and/or metadata to a new and/or updated floor plan). FIG. 11A illustrates a previous floor plan 1100 having region 1104 and objects 1102. The region 1104 and the objects 1102 may be examples of objects, regions and poses or locations for the AMD 102 to navigate to (e.g., indicating a location and direction for the AMD 102 to position at for example during an observation mode). The previous floor plan 1100 may be stored at the floor plan subsystem 120.

At FIG. 11B, an updated floor plan 1106 is received at the floor plan subsystem 120. The updated floor plan 1106 includes a region 1108 that corresponds with the previous floor plan 1100 and a new region 1110 that is newly explored in the occupancy map. The region 1108 shows a slightly different shape for the walls than the previous floor plan, which means that the region 1104 and markers 1102 cannot be transferred exactly over to the updated floor plan based on the difference in shape without introducing additional error. The markets 1102 may include viewpoints that include information related to a position and a direction, for example indicating a position and direction for an AMD to navigate to for various purposes such as monitoring of a space. The orientation of the markers and the viewpoints may be transferred to the updated floor plans and transformed such that the viewpoints with the positions and directions remain accurate across floor plan generations. In some examples, additional data may include historical presence data describing one or more locations where a user may reside or spend time within the floor plan. Such data, including viewpoint data, region boundaries, and historical presence data may collectively be referred to as spatial metadata and may include any data applied to the floor plan describing a region, position, or direction not extracted from an occupancy map. For example, such information may include segmented regions of a floor plan, boundaries of a region within a floor plan defined by artificial boundaries and/or walls, etc. Accordingly, a transformation is computed for the previous floor plan, as discussed above. The transformation provides the distortion of the previous floor plan 1100 required to match the shape of the region 1108. The same transformation is then applied to the region 1104 and the markers 1102 to produce the region 1116 and the markers 1114 of FIG. 11C. In this manner, transformations and distortions may be applied to preserve data and metadata associated with the previous floor plan 1100 as the floor plan is updated.

FIGS. 12A-12D illustrate an example of repairing geometry of a floor plan 1200. The floor plan 1200 includes regions 1202, 1204, 1206, and 1208. The floor plan 1200 at FIG. 12A includes overlapping geometry, gaps between regions (e.g., between region 1202, region 1204, and region 1208), and self-intersection (region 1206 being an instance of self-intersection of region 1204. If unrepaired, the floor plan 1200 may result in problems for use by one or more AMDs 102 and may not accurately reflect the environment. Furthermore, additional updates may fail to correct the errors present in the floor plan 1200 of FIG. 12A.

The floor plan subsystem 120 may receive the floor plan 1200, which may be stored at the floor plan subsystem as a set of region polygons. The walls of the floor plan 1200 may be repaired if portions of the region polygons may be marked as walls or by adding vectors. In the example shown in FIGS. 12A-12D, Delaunay triangulation is used in part to aid in repair of the floor plan 1200. At FIG. 12B, the floor plan 1200 is subdivided using Delaunay triangulation to produce the triangulation 1212. The Delaunay triangulation triangulates the floor plan such that no vertex of the region polygons falls within a triangle. The triangles may be examples of polygons that may be used to divide the space and other polygons may be used even though triangles are pictured in FIG. 12. The triangles or other polygons may be convex polygons with interior angles being less than one hundred and eighty degrees. The resulting triangulation 1212 shown in FIG. 12B does not include any self-intersection. In some examples, the triangulation 1212 may be further split into additional triangles to ensure that all boundary edges of the floor plan 1200 fall within the triangulation 1212.

Figure 12A:
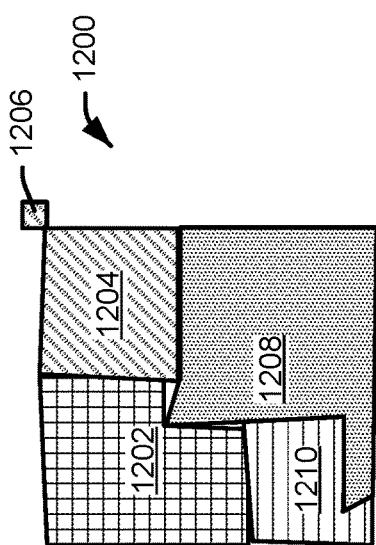
FIGS. 12A-12D illustrate an example of mapping regions and locations and/or markers to and updated floor plan, according to the present description.
Figure 12B:
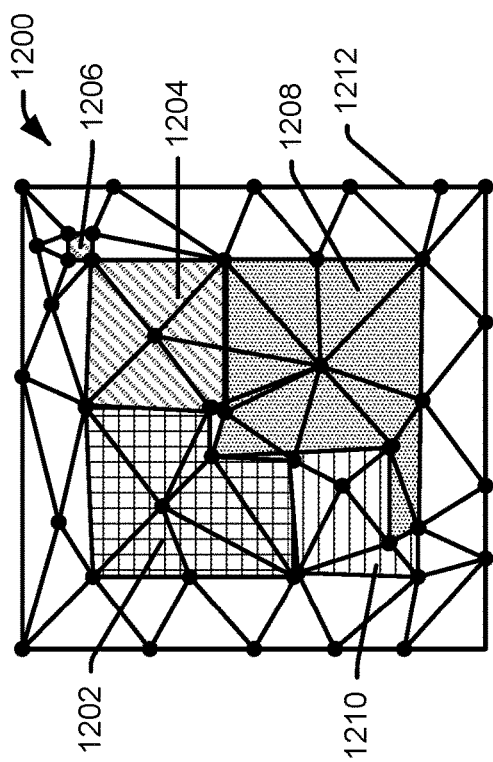
Figure 12C:
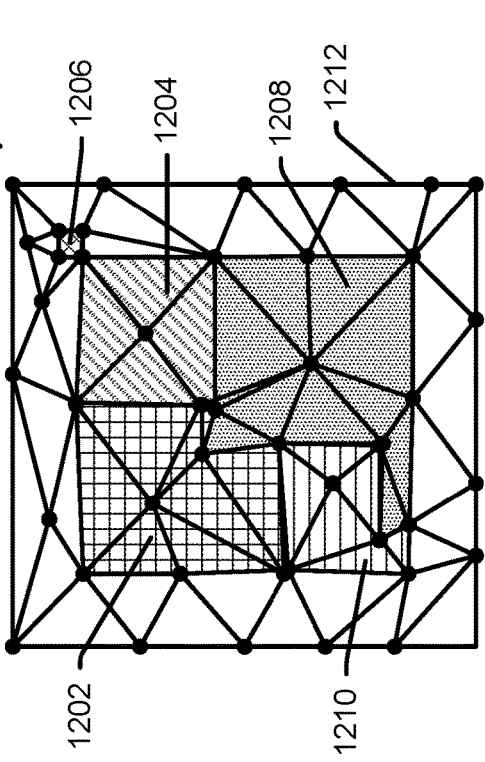

At FIG. 12C, region labels from the regions 1202, 1204, 1206, 1208, and 1210 are transferred to the triangulation 1212. The labels include the labeling of the regions and fill in the gaps between regions as well as resolving self-intersections and overlaps since each triangle of the triangulation 1212 receives only one label associated with a region it covers. In some examples, the triangles may be labeled based on a region that occupies the greatest portion of the triangle. For instance, if a triangle includes portions of two regions, but no vertices, then the region occupying the larger portion will transfer the label to the triangle. The region labels may be transferred to the triangulation using rasterization or triangle sampling in some examples. In some examples, any ambiguities (e.g., triangles associated with more than one region) may be resolved using a multi-label graph-cut.

Figure 12D:
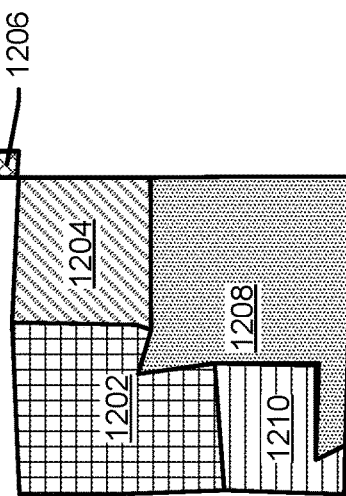

At FIG. 12D, the boundaries of the regions 1202, 1204, 1206, 1208, and 1210 are extracted from the triangulation. In some examples additional regions, for example separate region 1206 with a label separate from label for region 1204 may be created. In some examples decimation may be used to remove redundant points within the floor plan 1200.

Figure 13:
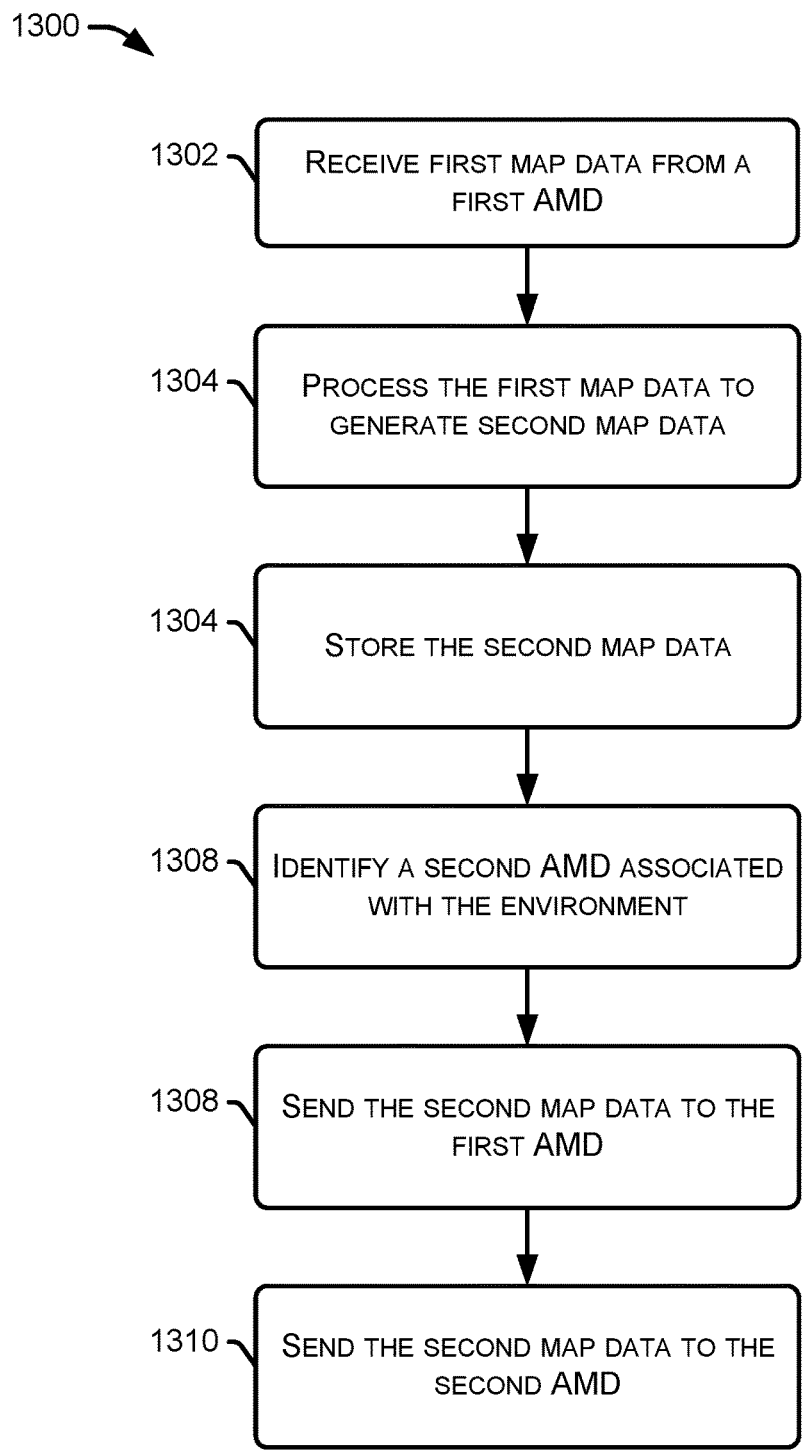
FIG. 13 is a flow diagram of an example process to produce and distribute a common floor plan amongst autonomous mobile devices in a shared environment, according to the resent description.

FIG. 13 is a flow diagram of an example process 1300 to produce and distribute a common floor plan amongst autonomous mobile devices in a shared environment. The process 1300, and processes 1400, 1500, and 1600 may each be performed, at least in part, by a processor of a computing device associated with the floor plan subsystem 120. The processes 1300, 1400, 1500, and 1600 may be performed partially or entirely on a remote computing device and may also be performed entirely or partially on-board an AMD 102. The processes 1300, 1400, 1500, and 1600 may be implemented as processor-executable instructions that may be stored on a suitable non-transitory storage medium.

At 1302, process 1300 includes receiving first map data from a first AMD 102. The first AMD 102 may gather data using a sensor system and produce an occupancy map that is transmitted to a floor plan subsystem 120 embodied on a cloud-based or remote computing device. The occupancy map may include data relating to the environment and describing each pixel of the occupancy as classified as occupied, free, or unexplored. The first map data may include a grid map, occupancy map, or other raw map data received from and AMD or other device as described herein.

At 1304, the process 1300 includes a floor plan subsystem 120 processing the first map data to generate second map data. The second map data may include a floor plan of a format suitable for use by a plurality of devices and easily portable between devices. The processing of the first map data may include some or all of the processing techniques described with respect to FIGS. 2-12 described above. In some examples, the processing may produce a floor plan with outlines of regions in the environment with layers that may include clutter, objects within the environment, metadata, and other such information. The second map data may include floor plans and such floor plans may be stored in a standardized format for use by various systems and devices.

At 1306, the process 1300 includes the floor plan subsystem 120 storing the second map data. The second map data may be stored at a cloud-based or other remote computing device that may be in communication with one or more AMDs 102 such that the stored map data may be shared and synchronized among the AMDs 102. In some examples, the first map data may be updated with the second map data while in some other examples the second map data may replace the first map data after transferring metadata and object spatial data to be associated with the second map data.

At 1308, the process 1300 includes identifying a second AMD 102 associated with the environment. The second AMD may be identified based on being associated with a user or a user account. The second AMD may also be identified based on proximity to an environment or other identifying techniques.

At 1310, the process 1300 includes sending the second map data to the first AMD. The first AMD may store a local copy of the second map data, including the floor plan. The second map data may be used by the first AMD to navigate within the environment, follow user-provided instructions specifying specific locations, or otherwise carry out location-specific tasks.

At 1312, the process 1300 includes sending the second map data to the second AMD. The second AMD may store a local copy of the second map data, including the floor plan. The second map data may be used by the second AMD to navigate within the environment, follow user-provided instructions specifying specific locations, or otherwise carry out location-specific tasks.

Figure 14:
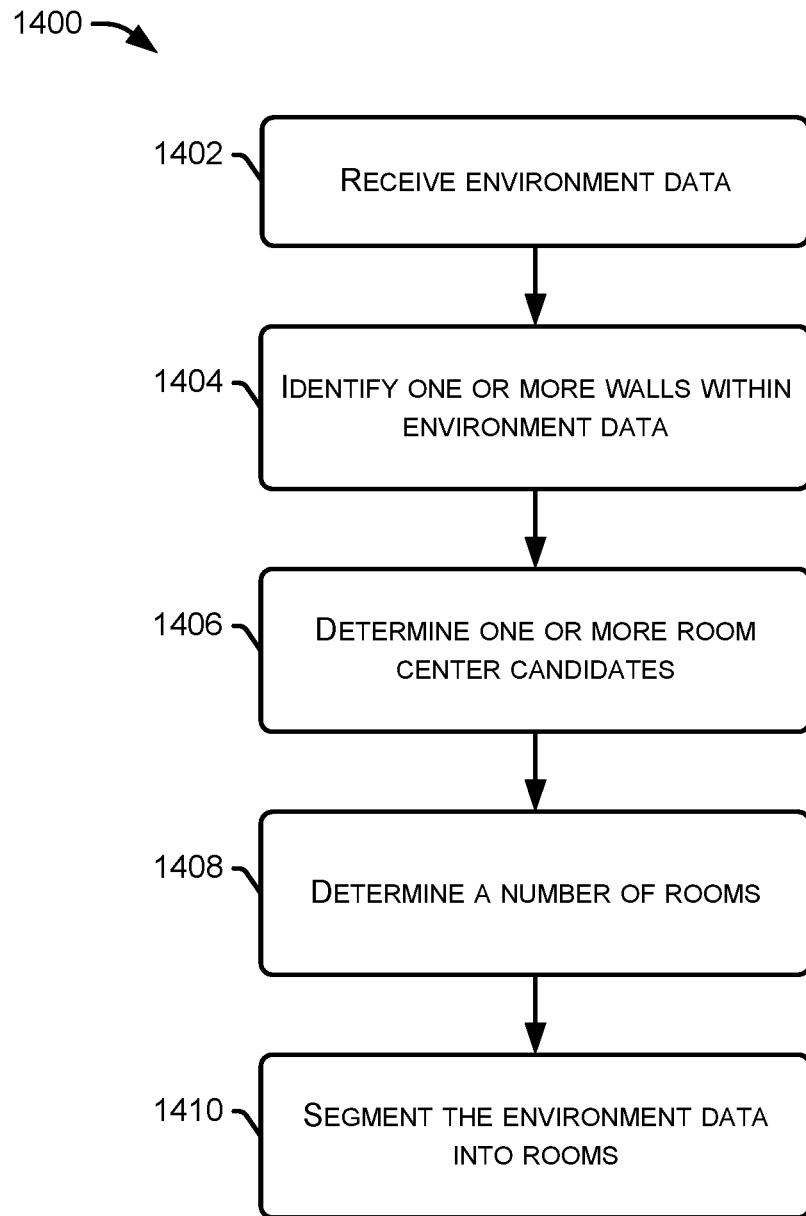
FIG. 14 is a flow diagram of an example process 1400 to automatically segment floor plan data into regions, according to the present description.

FIG. 14 is a flow diagram of an example process 1400 to automatically segment floor plan data into regions. At 1402, the process 1400 includes receiving environment data. The environment data may include an occupancy map, occupancy data, or other sensor-derived data indicating locations and presence of objects within an environment. The environment data may be received at a floor plan subsystem and/or an AMD. The environment data may include lidar data used to generate an occupancy map that may be transmitted to the floor plan subsystem.

At 1404, the process 1400 includes identifying one or more walls within the environment data. Various image recognition techniques including machine learning methods, rule-based methods, heuristic methods, and other algorithm based techniques may be used to identify the walls. The walls may be identified as part of a classification of the occupancy data, with the occupancy data classified as wall, clutter, unexplored, or free space as described above.

At 1406, the process 1400 includes determining one or more room center candidates. The room center candidates may be generated based on a distance transform computing a distance from every location within the data to a nearest extracted wall. Local maxima of the distance transform are identified as room center candidates as described above. The local maxima may include a number of candidates greater than a number of regions to divide the space within the walls.

At 1408, the process 1400 includes determining a number of rooms. The number of rooms may be determined based on a number of user-provided markers identifying rooms, based on heuristics, based on a watershed computation performed within the space using the room center candidates as seed points for the watershed computation. The number of rooms may be reduced by merging rooms based on heuristics and/or algorithm based approaches as described above.

At 1410, the process 1400 includes segmenting the environment data into rooms. The environment data, after being classified, walls extracted, and processed to identify rooms, may be extracted as a floor plan map or floor plan data describing a floor plan of the environment based on the environment data.

Figure 15:
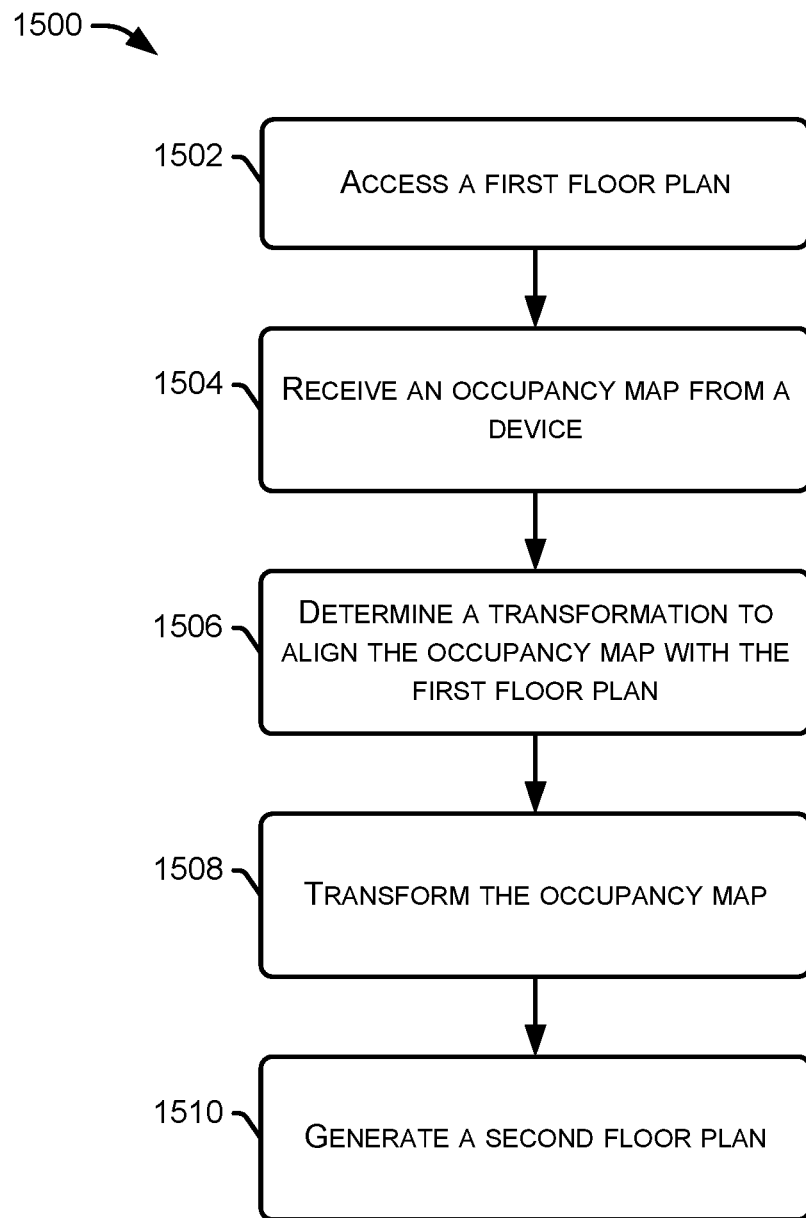
FIG. 15 is a flow diagram to transform a previous floor plan and associated objects to match a shape of an updated floor plan, according to the present description.

FIG. 15 is a flow diagram of an example process 1500 to transform a previous floor plan and associated objects to match a shape of an updated floor plan. At 1502, the process 1500 includes accessing a first floor plan. The first floor plan may be accessed by a floor plan subsystem from a storage device associated with the floor plan subsystem. The first floor plan may include layers of data including walls, objects, notes, metadata, regions, and other data within the first floor plan. The first floor plan may be accessed based on receiving an updated floor plan or updated data from one or more AMDs describing the environment described by the first floor plan.

At 1504, the process 1500 includes receiving an occupancy map from a device. The occupancy map may be provided by an AMD after gathering data using one or more detection systems and producing an occupancy map. In some examples, the AMD may convey the occupancy map to the floor plan subsystem in response to determining that the occupancy map differs from a stored version of the first floor plan located on the AMD and/or accessible by the AMD.

At 1506, the process 1500 includes determining a transformation to align the occupancy map with the first floor plan. In some examples, the occupancy map may be processed to classify the occupancy data and extract wall data and clutter data from the occupancy map before determining the transformation. The transformation may be determined based on markers positioned within the first floor plan as well as the occupancy map. The markers may be positioned within the maps such that aligning the markers provides a transformation required to manipulate one or the other until the shapes match. In some examples, the transformation may be determined based on wall shape matching or other such techniques described herein.

At 1508, the process 1500 includes transforming, by the floor plan subsystem, the occupancy map and/or the first floor plan. The transformation may be performed by the floor plan subsystem on the first floor plan or the occupancy map. The transformation being performed on the first floor plan also applies the transformation to objects, items, regions, and other spatial data associated with the first floor plan.

At 1510, the process 1500 includes generating a second floor plan. The second floor plan may be generated by transforming the first floor plan and the associated data as described above and then providing the spatial data after transformation to the transformed occupancy map to produce a second floor plan. The second floor plan may be stored at the floor plan subsystem and propagated to AMDs in communication with the floor plan subsystem.

Figure 16:
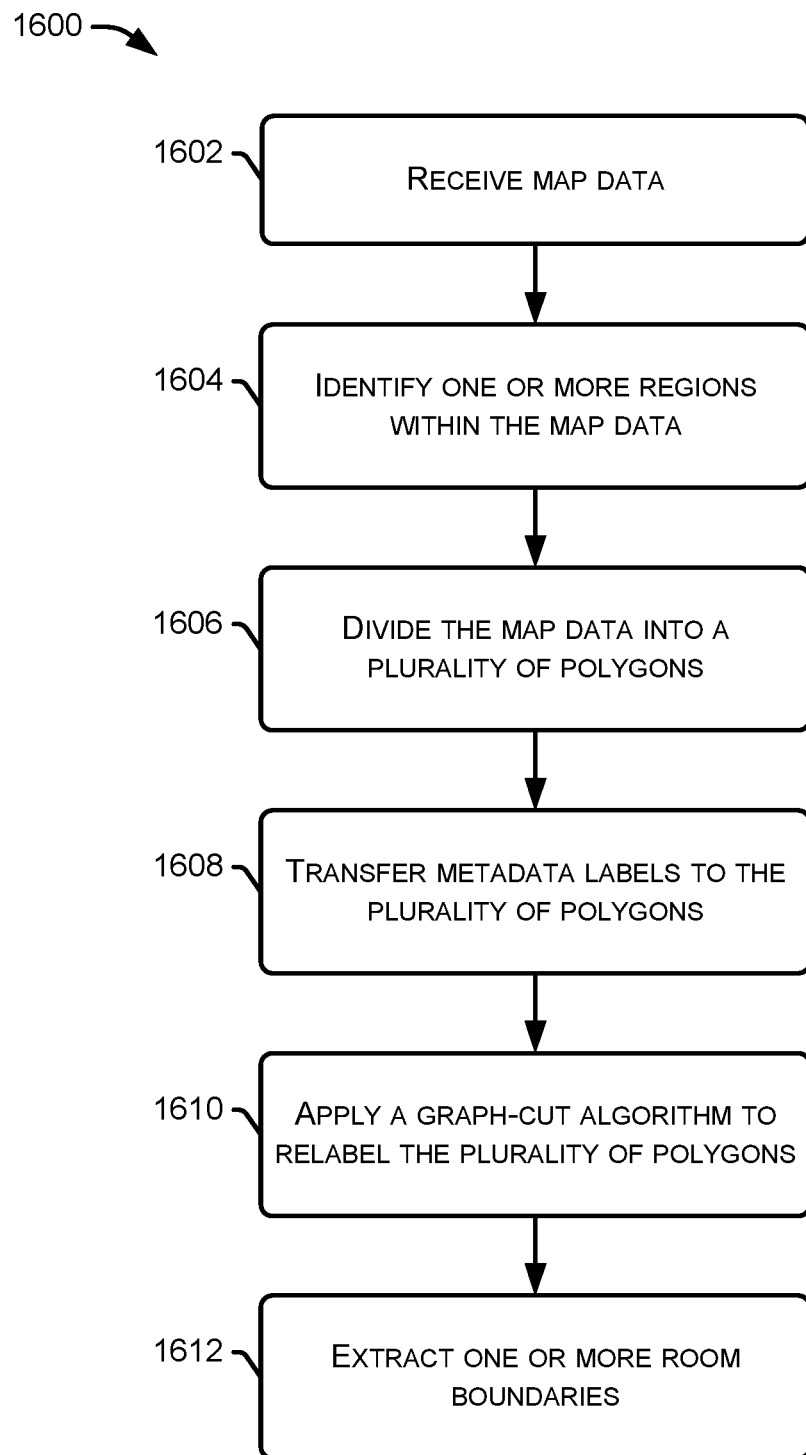
FIG. 16 is a flow diagram to repair a floor plan, according to the present description.

FIG. 16 is a flow diagram of an example process 1600 to repair a floor plan. At 1602, the process 1600 includes receiving map data. The map data may be received from an AMD and/or from the floor plan subsystem at a storage location. The map data may include errors or invalidities that result in the map data being conveyed for repair by the floor plan subsystem.

At 1604, the process 1600 includes identifying one or more regions within the map data. The regions may be regions identified according to the processes and techniques described herein. The regions may overlap, self-intersect, not meet adjacent regions, and otherwise have inconsistent geometry.

At 1606, the process 1600 includes dividing the map data into a plurality of polygons. The map data may be divided based on a triangulation such that the map data is divided amongst a series of triangles with vertices of the one or more regions at vertexes of the triangles.

At 1608, the process 1600 includes transferring metadata labels to the plurality of polygons. The labels associated with the regions overlapped by the polygons may be applied to the polygons, with ambiguities resolved and applied such that no gaps, inconsistencies, or errors exist within the triangulation layer.

At 1610, the process 1600 includes applying a graph-cut algorithm to relabel the plurality of polygons. The graph-cut algorithm may resolve the ambiguities between adjacent regions and results in triangles each having a label corresponding to only a single region.

At 1612, the process 1600 includes extracting one or more room boundaries based on the triangulation. The triangulation layer with the applied labels and metadata may be extracted and re-formatted into a floor plan with the polygons removed, leaving only a floor plan free from errors and inconsistency. The repaired floor plan may be stored at the floor plan subsystem and propagated to AMDs in communication with the floor plan subsystem.

FIG. 17 illustrates example components of an AMD 102, such as the AMD 102 of FIG. 1. It is to be appreciated that the example components depicted in FIG. 17 may be included in the AMD 102 operating as a standalone device. Additionally, or alternatively, at least some of the components depicted in FIG. 17 may be included in a remote (or external) device separate from the AMD 102. In this sense, the AMD 102 (and/or the one or more components thereof) may be part of a system, which may be distributed across multiple devices, or part of a single, standalone device, such as the AMD 102. The AMD 102, may be implemented as household robot, in some examples. In certain implementations, a limited set of one or more input components may be employed (e.g., a dedicated button to initiate a configuration, power on/off, etc.), and the primary mode of user interaction with the AMD 102 may be through voice input and audible output. The AMD 102 may also be implemented in other form factors besides a household robot, as described herein.

In the illustrated implementation, the AMD 102 includes one or more processors 1702 and computer-readable media 1704 (which may be referred to herein as "memory" of the AMD 102, and/or "local memory" of the AMD 102). In some implementations, the processors(s) 1702 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1302 may possess its own local memory, which also may store program modules, program data and/or other data, and/or one or more operating systems.

The computer-readable media 1704 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 1304 may be implemented as computer-readable storage media ("CRSM"), which may be any available physical media accessible by the processor(s) 1702 to execute instructions stored on the memory 1704. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1702.

Several modules such as instruction, datastores, and so forth may be stored within the computer-readable media 1704 and configured to execute on the processor(s) 1702. A few example functional modules are shown as applications stored in the computer-readable media 1704 and executed on the processor(s) 1702, although the same functionality may alternatively be implemented in hardware, firmware, or as a system on a chip (SOC).

An operating system 1706 may be configured to manage hardware within and coupled to the AMD 102 for the benefit of other modules. In addition, the AMD 102 may include a mobility subsystem 1708 to control movement of the AMD 102 within an environment 100 or through a space (e.g., over a floor 104). For example, the mobility subsystem 1708 may control propulsion and/or turning maneuvers of the AMD 102. In some examples, the mobility subsystem 1708 may handle navigation functions, such as navigating from an origin to a destination, and/or the generation and use of a map (e.g., an obstacle map) for obstacle avoidance during movement. In some examples, the mobility subsystem 1708 may utilize a simultaneous localization and mapping (SLAM) algorithm in conjunction with one or more sensors of the AMD 102. The mapping subsystem 108 described herein may be used to access, process, and provide occupancy maps as well as floor plan maps for use by the mobility subsystem 1708 for navigating in the environment. The AMD 102 may further include a safety subsystem 1710 to monitor for hazards and to take preventative and/or remedial action, such as stopping the movement of the AMD 102, implementing a preventative maneuver, and/or outputting a warning, an alert, or the like. The mobility subsystem 1708 may communicate with a lidar component 110 described herein for determining objects and walls within the environment.

The lidar component 110 may communicate with one or more applications 1712 to generate an occupancy map based on lidar data. The applications 1712 may also include applications 1712 for processing and extracting floor plans from occupancy data, as described herein. The applications 1712 may include components of the floor plan subsystem that may be implemented on the AMD and/or at a remote computing device, such as the remote computing device 116 of FIG. 1.

The AMD 102 may also include one or more applications 1712 stored in the computer-readable media 1704 or otherwise accessible to the AMD 102. In some examples, the applications 1712 may include, without limitation, a music player, a movie player, a timer, and a personal shopper, or any other suitable application. The applications 1712 may also include one or more applications to perform processes related to generation and updating of floor plans, or other processes described herein. In some examples, the processes described herein may be performed on a remote computing device, such as the remote computing device 116 of FIG. 1 in communication with the AMD. The AMD 102 may also include a speech processing component 1714 configured to recognize user speech. For example, a user may speak to the AMD 102, and the AMD 102 may perform an action in response to the user speech. The AMD 102 may utilize a remote system for speech processing, and/or the speech processing component 1714 may be a local speech processing component configured to process speech without relying on a remote speech processing system. Additionally, or alternatively, the speech processing component 1714 may be configured to implement a hybrid approach where some speech processing is performed in the "cloud" and some speech processing is performed locally.

Generally, the AMD 102 has input devices 1720 and output devices 1722. The input devices 1720 may include, without limitation, a keyboard, keypad, mouse, touch screen, joystick, control buttons, etc. In some implementations, one or more microphones may function as input devices 1720 to receive audio input, such as user voice input. Additionally, or alternatively, the LIDAR component(s) 110 may function as an input device(s) 1720 to provide floor detection capabilities, as described herein. The output device(s) 1722 may include, without limitation, a display(s), a light element (e.g., LED), a vibrator to create haptic sensations, or the like. In some implementations, one or more speakers may function as output devices 1722 to output audio sounds (e.g., audio content, text-to-speech (TTS) responses, other voice prompts, tones at various frequencies, etc.). A user may interact with the AMD 102 by speaking to it, and the AMD 102 can communicate back to the user by emitting audible statements through a speaker(s). In this manner, the user 104 can interact with the AMD 102 solely through speech, without use of a keyboard or display. Additionally, or alternatively, motors, wheels, gears, movable legs, propellers, or the like may function as output devices 1722 to control movement of the AMD 102 within and/or through an environment 100, such as by propelling and/or turning the AMD 102 in any direction and at various speeds and accelerations.

The AMD 102 may further include a communications interface 1724, such as a wireless unit coupled to an antenna to facilitate a wireless connection to a network. Such a wireless unit may implement one or more of various wireless and/or IoT technologies, such as Bluetooth® protocol, Bluetooth Low Energy (BLE) protocol, ZigBee® protocol, Z-Wave® protocol, WiFi protocol, and/or any other type of protocol usable to communicate wirelessly between electronic devices in an environment, including those that do and/or do not rely data transmission over a wide area network. The communications interface 1724 may also include a universal serial bus (USB) port(s) to facilitate a wired connection to a network, or a plug-in network device that communicates with other wireless networks. In addition to the USB port, or as an alternative thereto, other forms of wired connections may be employed, such as a broadband connection, Transmission Control Protocol/Internet Protocol (TCP/IP) protocol connection, etc. The communications interface 1724 may include some or all of these components, and/or other components to facilitate communication with other devices.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. A method, comprising:
   receiving map data from an autonomous mobile device disposed within a physical environment, wherein the receiving of the map data from the autonomous mobile device is in response to the autonomous mobile device being unable to navigate the physical environment based at least in part on a stored floor plan of the physical environment;
   receiving first floor plan data representing the stored floor plan;
   comparing, using one or more algorithms, the map data with the first floor plan data to identify edits to be applied to the stored floor plan;
   generating, based at least in part on the comparing, an edit patch including instructions to produce edits over the stored floor plan;
   analyzing the edit patch to identify one or more regions defined by vertices within the map data;
   determining one or more polygons dividing the map data into polygons such that none of the vertices fall within an area defined by a polygon of the polygons;
   determining one or more room boundaries for the first floor plan based on the polygons;
   generating second floor plan data representing the map data based on the one or more room boundaries; and
   conveying the second floor plan data to the autonomous mobile device to update the stored floor plan such that the autonomous mobile device is able to navigate the physical environment based at least in part on the update of the stored floor plan.

2. The method of claim 1, wherein the map data received from the autonomous mobile device has one or more geometric inconsistencies including at least one of:
   overlapping map data;
   self-intersection of map data; or
   a gap between adjacent regions of the map data.

3. The method of claim 1, wherein the polygons comprise convex polygons.

4. The method of claim 1, wherein determining the one or more room boundaries comprises determining a room boundary of the one or more room boundaries based on an edge of a polygon of the polygons.

5. The method of claim 1, wherein identifying one or more regions within the map data comprises determining a line score corresponding to a likelihood that a first portion comprises a line segment and wherein determining the line segment corresponds to a wall defining at least one of the one or more regions based on the line score exceeding a threshold.

6. The method of claim 1, wherein determining the one or more room boundaries comprises defining one or more room boundaries based on an optimization algorithm configured to balance one or more room boundary definition heuristics.

7. The method of claim 6, wherein the one or more room boundary definition heuristics comprise defining an angle between a wall of the first floor plan data and a room boundary of the one or more room boundaries as perpendicular.

8. The method of claim 6, wherein the one or more room boundary definition heuristics comprise defining a room boundary of the one or more room boundaries as parallel with a wall of the first floor plan data.

9. The method of claim 1, wherein receiving the map data from the autonomous mobile device is in response to identifying a geometric error including at least one of an overlap, a self-intersection, or a gap between adjacent data such that the autonomous mobile device is unable to navigate the environment.

10. A non-transitory computer-readable medium having instructions stored thereon that, when executed by one or more processors, cause the one or more processors to:
    receive map data from an autonomous mobile device disposed within a physical environment, wherein the receiving of the map data from the autonomous mobile device is in response to the autonomous mobile device being unable to navigate the physical environment based at least in part on a stored floor plan of the physical environment;
    receive first floor plan data representing the stored floor plan;
    compare, using one or more algorithms, the map data with the first floor plan data to identify edits to be applied to the stored floor plan;
    generate, based at least in part on the comparing, an edit patch including instructions to produce edits over the stored floor plan;
    analyze the edit patch to identify one or more regions defined by vertices within the map data;
    determine one or more polygons to divide the map data such that none of the vertices fall within an area defined by a polygon of the polygons;
    determine one or more room boundaries for the first floor plan based on the polygons;
    generate second floor plan data representing the map data based on the one or more room boundaries; and
    convey the second floor plan data to the autonomous mobile device to update the stored floor plan such that the autonomous mobile device is able to navigate the physical environment based at least in part on the update of the stored floor plan.

11. The non-transitory computer-readable medium of claim 10, wherein the map data comprises an occupancy map received from the autonomous mobile device having at least one of a self-intersection, an overlap in map data, or a gap between adjacent portions of map data.

12. The non-transitory computer-readable medium of claim 10, wherein determining the one or more room boundaries comprises defining one or more room boundaries based on an optimization algorithm configured to balance one or more room boundary definition heuristics, the one or more room boundary definition heuristics including at least one of:
    defining an angle between a wall of the first floor plan data and a room boundary of the one or more room boundaries as perpendicular; and
    defining a room boundary of the one or more room boundaries as parallel with a wall of the first floor plan data.

13. The non-transitory computer-readable medium of claim 10, wherein dividing the map data into the one or more polygons comprises triangulating the map according to a Delaunay triangulation.

14. The non-transitory computer-readable medium of claim 10, wherein the instructions to determine one or more room boundaries comprise further instructions to determine a room boundary based on a perimeter of a polygon of the plurality of polygons.

15. A method, comprising:
   receiving map data from an autonomous mobile device disposed within a physical environment, wherein the receiving of the map data from the autonomous mobile device is in response to the autonomous mobile device being unable to navigate the physical environment based at least in part on a stored floor plan of the physical environment;
   receiving first floor plan data representing the stored floor plan;
   comparing, using one or more algorithms, the map data with the first floor plan data to identify edits to be applied to the stored floor plan;
   generating, based at least in part on the comparing, an edit patch including instructions to produce edits over the stored floor plan;
   determining one or more room boundaries for the first floor plan;
   generating second floor plan data representing the map data based on the one or more room boundaries; and
   conveying the second floor plan data to the autonomous mobile device to update the stored floor plan such that the autonomous mobile device is able to navigate the physical environment based at least in part on the update of the stored floor plan.

16. The method of claim 15, wherein the map data received from the autonomous mobile device has one or more geometric inconsistencies including at least one of:
   overlapping map data
   self-intersection of map data; or
   a gap between adjacent regions of the map data.

17. The method of claim 15, further comprising:
   determining one or more polygons dividing the map data into polygons such that no vertices fall within an area defined by a polygon of the polygons.

18. The method of claim 17, wherein determining the one or more room boundaries comprises determining a room boundary of the one or more room boundaries based on an edge of a polygon of the polygons.

19. The method of claim 17, wherein determining the one or more room boundaries comprises defining one or more room boundaries based on an optimization algorithm configured to balance one or more room boundary definition heuristics.

20. The method of claim 19, wherein the one or more room boundary definition heuristics comprise defining an angle between a wall of the first floor plan data and a room boundary of the one or more room boundaries as perpendicular.

* * * * *